United States Patent
Lu et al.

(10) Patent No.: US 12,501,056 B2
(45) Date of Patent: *Dec. 16, 2025

(54) INTEGRATED IMAGE RESHAPING AND VIDEO CODING

(71) Applicant: Dolby Laboratories Licensing Corporation, San Francisco, CA (US)

(72) Inventors: Taoran Lu, Santa Clara, CA (US); Fangjun Pu, Sunnyvale, CA (US); Peng Yin, Ithaca, NY (US); Tao Chen, Palo Alto, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/666,734

(22) Filed: May 16, 2024

(65) Prior Publication Data

US 2024/0305791 A1    Sep. 12, 2024

Related U.S. Application Data

(63) Continuation of application No. 17/940,819, filed on Sep. 8, 2022, now Pat. No. 12,015,786, which is a
(Continued)

(51) Int. Cl.
*H04N 19/159* (2014.01)
*H04N 19/124* (2014.01)
(Continued)

(52) U.S. Cl.
CPC ......... *H04N 19/159* (2014.11); *H04N 19/124* (2014.11); *H04N 19/182* (2014.11); *H04N 19/45* (2014.11)

(58) Field of Classification Search
CPC .. H04N 19/159; H04N 19/124; H04N 19/182; H04N 19/45; H04N 19/98;
(Continued)

(56) References Cited

U.S. PATENT DOCUMENTS 9,225,989 B2 * 12/2015 Kärkkäinen ......... H04N 19/186
10,015,491 B2   7/2018 Su
(Continued)

FOREIGN PATENT DOCUMENTS

CN    105324997    2/2016
CN    104054338 B  4/2019
(Continued)

OTHER PUBLICATIONS

Baylon, D. et al "Response to Call for Evidence for HDR and WCG Video Coding: Arris, Dolby and Interdigital" Doc. m36264, Jul. 2015, Warsaw, Poland.
(Continued)

*Primary Examiner* — Marnie A Matt

(57) ABSTRACT

Given a sequence of images in a first codeword representation, methods, processes, and systems are presented for integrating reshaping into a next generation video codec for encoding and decoding the images, wherein reshaping allows part of the images to be coded in a second codeword representation which allows more efficient compression than using the first codeword representation. A variety of architectures are discussed, including: an out-of-loop reshaping architecture, an in-loop-for intra pictures only reshaping architecture, an in-loop architecture for prediction residuals, and a hybrid in-loop reshaping architecture. Syntax methods for signaling reshaping parameters, and image-encoding methods optimized with respect to reshaping are also presented.

10 Claims, 20 Drawing Sheets

Related U.S. Application Data continuation of application No. 17/240,866, filed on Apr. 26, 2021, now Pat. No. 11,490,095, which is a continuation of application No. 16/619,074, filed as application No. PCT/US2018/040287 on Jun. 29, 2018, now Pat. No. 10,992,941.

(60) Provisional application No. 62/686,738, filed on Jun. 19, 2018, provisional application No. 62/680,710, filed on Jun. 5, 2018, provisional application No. 62/629,313, filed on Feb. 12, 2018, provisional application No. 62/561,561, filed on Sep. 21, 2017, provisional application No. 62/526,577, filed on Jun. 29, 2017.

(51) Int. Cl.
*H04N 19/182* (2014.01)
*H04N 19/44* (2014.01)

(58) Field of Classification Search
CPC .... H04N 19/34; H04N 19/117; H04N 19/136; H04N 19/82; H04N 19/107; H04N 19/174; H04N 19/176; H04N 19/463; H04N 19/503; H04N 19/44; H04N 19/61; H04N 19/132; H04N 19/423; H04N 19/60; H04N 19/70
USPC .................................................. 375/240.13
See application file for complete search history.

(56) References Cited

U.S. PATENT DOCUMENTS

| | | | |
|---|---|---|---|
| 10,136,133 | B2 | 11/2018 | Lu |
| 10,165,275 | B2 | 12/2018 | Lu |
| 10,477,212 | B2 | 11/2019 | Lu |
| 10,542,289 | B2 | 1/2020 | Yin |
| 2006/0095243 | A1 | 5/2006 | Levy |
| 2006/0268991 | A1 | 11/2006 | Segall |
| 2011/0249738 | A1 | 10/2011 | Suzuki |
| 2011/0255101 | A1 | 10/2011 | Edge |
| 2012/0177103 | A1 | 7/2012 | Fu |
| 2012/0281009 | A1 | 11/2012 | Wenhui |
| 2013/0208998 | A1 | 8/2013 | Yoshizawa |
| 2014/0003527 | A1 | 1/2014 | Tourapis |
| 2015/0215634 | A1 | 7/2015 | Jia |
| 2017/0085881 | A1 | 3/2017 | Atkins |
| 2017/0111643 | A1 | 4/2017 | Bugdayci Sansli |
| 2017/0251211 | A1 | 8/2017 | Froehlich |
| 2018/0007374 | A1 | 1/2018 | Atkins |
| 2018/0103253 | A1 | 4/2018 | Lu |
| 2018/0131938 | A1 | 5/2018 | Lu |
| 2018/0278967 | A1 | 9/2018 | Kerofsky |
| 2020/0120345 | A1 | 4/2020 | Guo |

FOREIGN PATENT DOCUMENTS

| | | |
|---|---|---|
| RU | 2194361 | 12/2002 |
| RU | 2370908 C2 | 10/2009 |
| WO | 2010038587 A1 | 4/2010 |
| WO | 2012122425 A1 | 9/2012 |
| WO | 2014204865 A1 | 12/2014 |
| WO | 2016153896 A1 | 9/2016 |
| WO | 2016164235 A1 | 10/2016 |
| WO | 2016172091 A1 | 10/2016 |
| WO | 2016172361 A1 | 10/2016 |
| WO | 2017011636 A1 | 1/2017 |
| WO | 20170053432 A1 | 3/2017 |
| WO | 2017201066 A1 | 11/2017 |

OTHER PUBLICATIONS

Francois, E. et al "Common Test Conditions for HDR/WCG video coding experiments", JCTVC doc. X1020, Geneva, May 2016.

Francois, E. et al "Description of Core Experiment 12 (CE12): Mapping for HDR Content" JVET Meeting Apr. 2018 (The Joint Video Exploration Team of ISO/IEC JTC1/SC29/WG11 and ITU-T SG.16), pp. 5-6.

ITU-T H.265, "High efficiency video coding," ITU, version 4.0, (Dec. 2016).

J. Samuelsson et al. (Eds), "Conversion and coding practices for HDR/WCG Y'CbCr 4:2:0 Video with PQ Transfer Characteristics," JCTVC-Y1017, ITU-T/ISO meeting, Chengdu, Oct. 2016.

Lu, T. et al "HDR CE2 related: Further Improvement of JCTVC-W0084", JCTVC doc. W0085, San Diego, Feb. 2016.

Minoo, A. et al "Description of the Exploratory Test Model (ETM) for HDR/WCG Extension of HEVC" JCT-VC Meeting Feb. 2016, San Diego, Joint Collaborative Team on Video Coding of ISO/IEC JTC1/SC29/WG11.

Minoo, A. et al "Description of the Reshaper Parameters Derivation Process in ETM Reference Software" JCT-VC Meeting Feb. 19-26, 2016, San Diego.

Minoo, K. et al "Exploratory Test Model for HDR extension of HEVC" Oct. 2015, ISO/IEC JTC1/SC29/WG11 MPEG2014/ N15792, Geneva, CH.

Pouli, T. et al "Progressive Color Transfer for Images of Arbitrary Dynamic Range" Computers and Graphics, vol. 35, No. 1, Nov. 5, 2010, pp. 67-80.

Segall, A. et al "JVET Common Test Conditions and Evaluation Procedures for HDR/WCG Video", JVET-E1020, ITU-T meeting, Geneva, Jan. 2017.

Xiu, X. et al "Description of SDR, HDR, and 360 Video Coding Technology Proposal by InterDigital Communications and Dolby Laboratories" JVET of ITU-T SG 16 WP3 and ISO/IEC JTC 1/SC29WG11, 10th Meeting, San Diego, Apr. 10-20, 2018, pp. 33-34.

Taoran Lu, et al., "Adaptive Reshaper for High Dynamic Range and Wide Color Gamut Video Compression," Applications of Digital Image Processing XXXIX, edited by Andrew G. Tescher, Proc. of SPIE vol. 9971, 99710B, 2016 SPIE.

* cited by examiner

INTEGRATED IMAGE RESHAPING AND VIDEO CODING

CROSS-REFERENCE TO RELATED APPLICATIONS

This application is a continuation of U.S. patent application Ser. No. 17/940,819, filed on Sep. 8, 2022, which is a continuation of U.S. patent application Ser. No. 17/240,866, filed on Apr. 26, 2021, now U.S. Pat. No. 11,490,095, issued on 1 Nov. 2022, which is a continuation of U.S. patent application Ser. No. 16/619,074, filed on Dec. 3, 2019, now U.S. Pat. No. 10,992,941, issued on 27 Apr. 2021, which is the U.S. national stage for PCT Application Ser. No. PCT/US2018/040287, filed on Jun. 29, 2018, which claims priority to U.S. Provisional Patent Application Ser. No. 62/686,738, filed on Jun. 19, 2018; Ser. No. 62/680,710, filed on Jun. 5, 2018; Ser. No. 62/629,313, filed on Feb. 12, 2018; Ser. No. 62/561,561, filed on Sep. 21, 2017; and Ser. No. 62/526,577, filed on Jun. 29, 2017, each of which is incorporated herein by reference in its entirety.

TECHNOLOGY

The present invention relates generally to images and video coding. More particularly, an embodiment of the present invention relates to integrated image reshaping and video coding.

BACKGROUND

In 2013, the MPEG group in the International Standardization Organization (ISO), jointly with the International Telecommunications Union (ITU), released the first draft of the HEVC (also known as H.265) video coding standard. More recently, the same group has released a call for evidence to support the development of a next generation coding standard that provides improved coding performance over existing video coding technologies.

As used herein, the term 'bit depth' denotes the number of pixels used to represent one of the color components of an image. Traditionally, images were coded at 8-bits, per color component, per pixel (e.g., 24 bits per pixel); however, modern architectures may now support higher bit depths, such as 10 bits, 12 bits or more.

In a traditional image pipeline, captured images are quantized using a non-linear opto-electronic transfer function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT.2020, and the "PQ" (perceptual quantization) curve, described in SMPTE ST 2084 and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution. As appreciated by the inventors here, as development begins for the next generation of a video coding standard, improved techniques for the integrated reshaping and coding of images are desired. Methods of this invention can be applicable to a variety of video content, including, but not limited, to content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
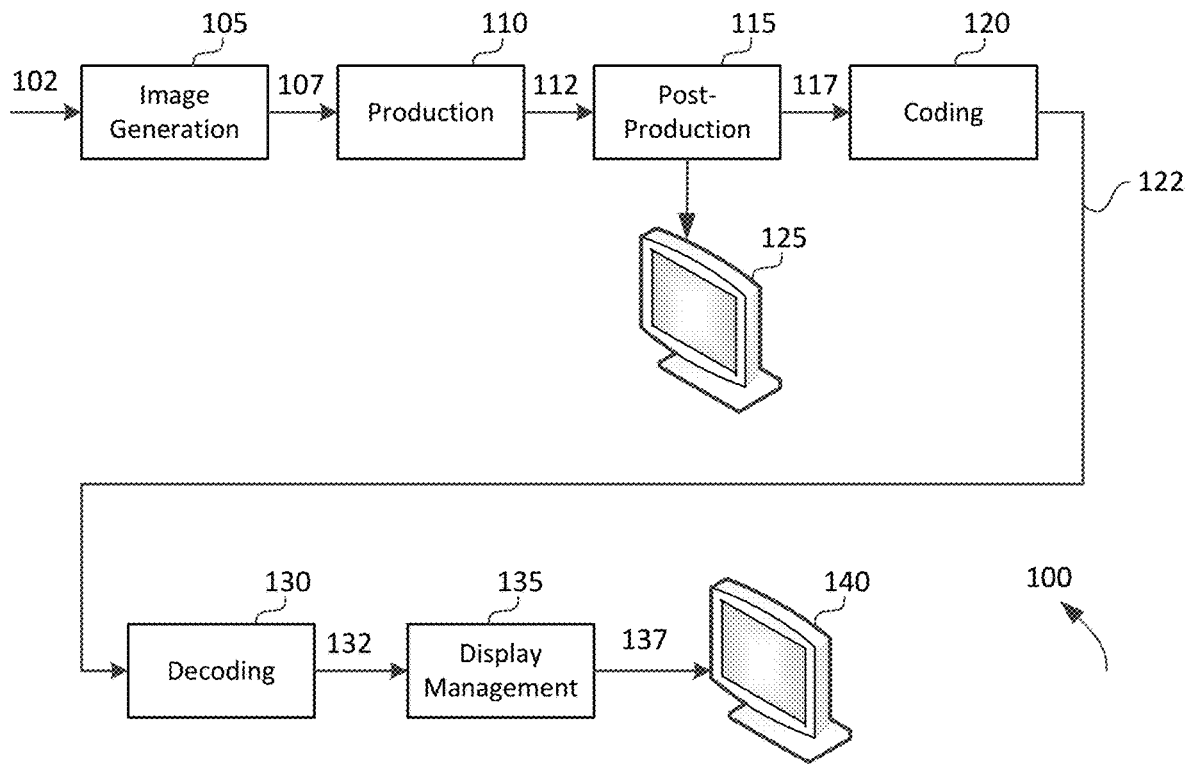
FIG. 1A depicts an example process for a video delivery pipeline.

Normative out-of-loop and in-loop integrated signal reshaping and coding techniques for compressing images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to integrated signal reshaping and coding for video. In an encoder, a processor receives an input image in a first codeword representation represented by an input bit depth N and an input codeword mapping (e.g., gamma, PQ, and the like). The processor selects an encoder architecture (with a reshaper being an integral part of the encoder) from two or more candidate encoder architectures for compressing the input image using a second codeword representation allowing for a more efficient compression than the first codeword representation, wherein the two or more candidate encoder architectures comprise an out-of-loop reshaping architecture, an in-loop-for intra pictures only reshaping architecture, or an in-loop architecture for prediction residuals, and the processor compresses the input image according to the selected encoder architecture.

In another embodiment, a decoder for generating output images in the first codeword representation receives a coded bitstream with at least part of the coded images being compressed in the second codeword representation. It also receives associated reshaping information. The processor receives signaling indicating the decoder architecture from two or more candidate decoder architectures for decompressing the input coded bitstream, wherein the two or more candidate decoder architectures comprise an out-of-loop reshaping architecture, an in-loop-for intra pictures only reshaping architecture, or an in-loop architecture for prediction residuals, and it decompresses the coded image to generate an output image according to the received reshaping architecture.

In another embodiment, in an encoder for compressing images according to an in-loop architecture for prediction residuals, the processor accesses an input image in a first codeword representation and generates a forward reshaping function mapping pixels of the input image from the first codeword representation to the second codeword representation. It generates an inverse reshaping function based on the forward reshaping function mapping pixels from the second codeword representation to pixels in the first codeword representation. Then, for an input pixel region in the input image: it computes at least one predicted region based in pixel data in a reference frame buffer or previously coded spatial neighbors;

generates a reshaped residual region based on the input pixel region, the predicted region, and the forward reshaping function;

generates a coded (transformed and quantized) residual region based on the reshaped residual region;

generates a decoded (inverse quantized and transformed) residual region based on the coded residual region;

generates a reconstructed pixel region based on the decoded residual region, the predicted region, the forward reshaping function, and the inverse reshaping function; and generates a reference pixel region to be stored on the reference frame buffer based on the reconstructed pixel region.

In another embodiment, in a decoder for generating output images in the first codeword representation according to an in-loop architecture for prediction residuals, the processor receives a coded bitstream partially coded in the second codeword representation. It also receives associated reshaping information. The processor generates based on the reshaping information a forward reshaping function which maps pixels from the first codeword representation to the second codeword representation and an inverse reshaping function, wherein the inverse reshaping function maps pixels from the second codeword representation to the first codeword representation. For a region of the coded image, the processor:

generates a decoded reshaped residual region based on the coded image;

generates a predicted region based on pixels in a reference pixel buffer or previously decoded spatial neighbors;

generates a reconstructed pixel region based on the decoded reshaped residual region, the predicted region, the forward reshaping function, and the inverse reshaping function;

generates an output pixel region based on the reconstructed pixel region; and, stores the output pixel region in the reference pixel buffer.

Example Video Delivery Processing Pipeline

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Figure 1B:
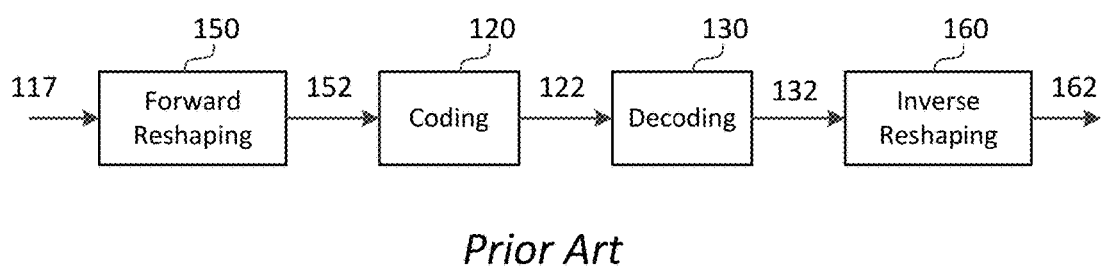
FIG. 1B depicts an example process for data compression using signal reshaping according to prior art.

FIG. 1B depicts an example process for signal reshaping according to prior art Ref. [1]. Given input frames (117), a forward reshaping block (150) analyzes the input and the coding constraints and generates codeword mapping functions which map input frames (117) to re-quantized output frames (152). For example, input (117) may be encoded according to certain electro-optical transfer function (EOTF) (e.g., gamma). In some embodiments, information about the reshaping process may be communicated to downstream devices (such as decoders) using metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Following coding (120) and decoding (130), decoded frames (132) may be processed by a backward (or inverse) reshaping function (160), which converts the re-quantized frames (132) back to the original EOTF domain (e.g., gamma), for further downstream processing, such as the display management process (135) discussed earlier. In some embodiments, the backward reshaping function (160) may be integrated with a de-quantizer in decoder (130), e.g., as part of the de-quantizer in an AVC or HEVC video decoder.

As used herein, the term "reshaper" may denote a forward or an inverse reshaping function to be used when coding and/or decoding digital images. Examples of reshaping functions are discussed in Ref. [1] and [2]. For the purposes of this invention, it is assumed that a person skilled in the art can derive suitable forward and inverse reshaping functions according to the characteristics of the input video signal and the available bit-depth of the encoding and decoding architectures.

In Ref. [1], an in-loop block-based image reshaping method for high dynamic range video coding was proposed. That design allows block-based reshaping inside the coding loop, but at a cost of increased complexity. To be specific, the design requires maintaining two sets of decoded-image buffers: one set for inverse-reshaped (or non-reshaped) decoded pictures, which can be used for both prediction without reshaping and for output to a display, and another set for forward-reshaped decoded pictures, which is used only for prediction with reshaping. Though forward-reshaped decoded pictures can be computed on the fly, the complexity cost is very high, especially for inter-prediction (motion compensation with sub-pixel interpolation). In general, display-picture-buffer (DPB) management is complicated and requires very careful attention, thus, as appreciated by the inventors, simplified methods for coding video are desired.

Embodiments of reshaping-based codec architectures presented herein may be divided as follows: an architecture with an external, out-of-loop reshaper, an architecture with an in-loop intra only reshaper, and an architecture with an in-loop reshaper for prediction residuals, also to be referred for short as 'in-loop residual reshaper.' A video encoder or decoder may support any one of these architectures or a combination of them. Each of these architectures may also be applied on its own or in combination with any one of the others. Each architecture may be applied for the luminance component, a chroma component, or a combination of the luma and one or more chroma components.

In addition to these three architectures, additional embodiments describe efficient signaling methods for metadata related to reshaping, and several encoder-based optimization tools to improve coding efficiency when reshaping is applied.

Normative Out-of-Loop Reshaper

Figure 2A:
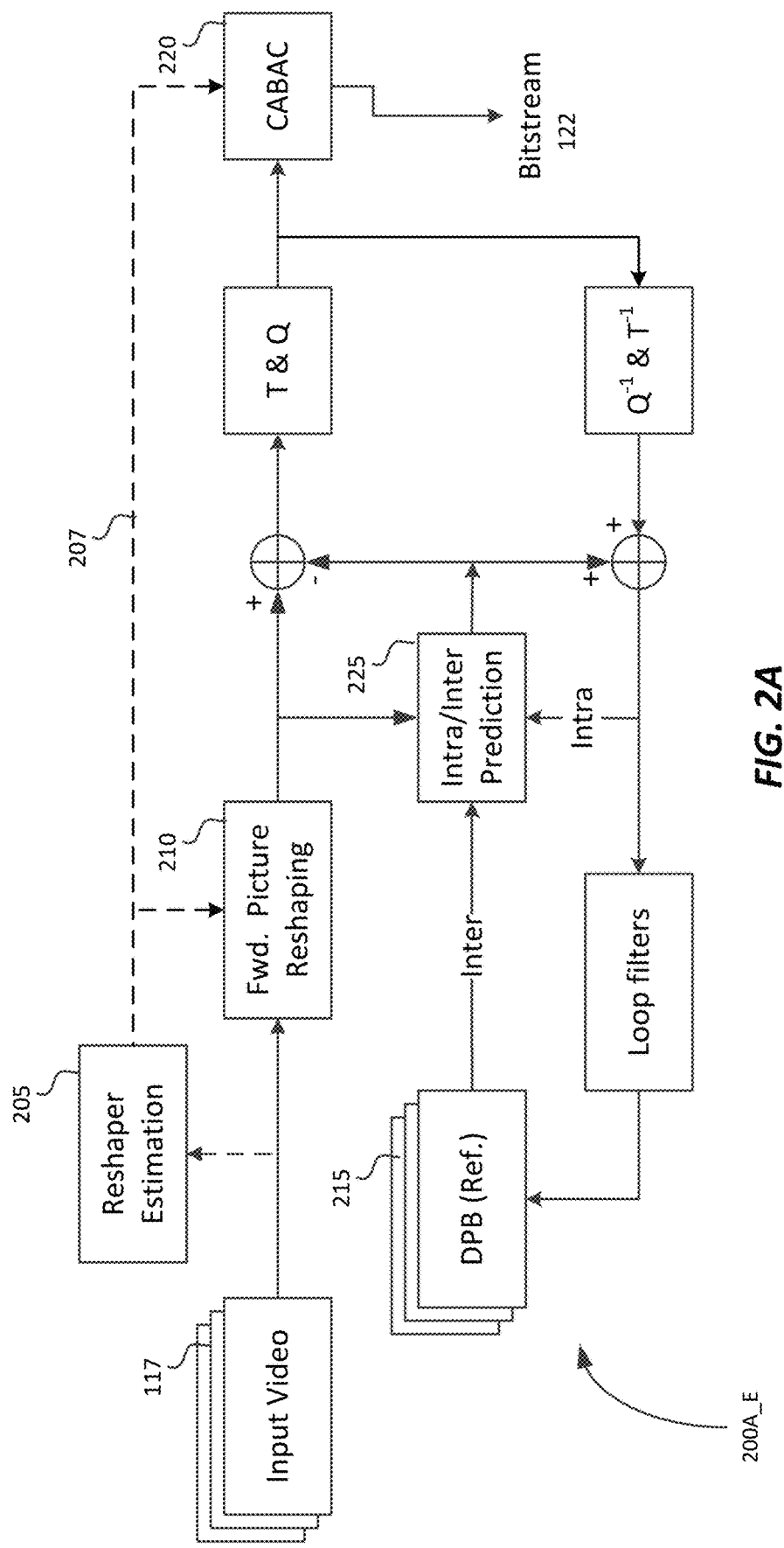
FIG. 2A depicts an example architecture for an encoder using normative out-of-loop reshaping according to an embodiment of this invention.
Figure 2B:
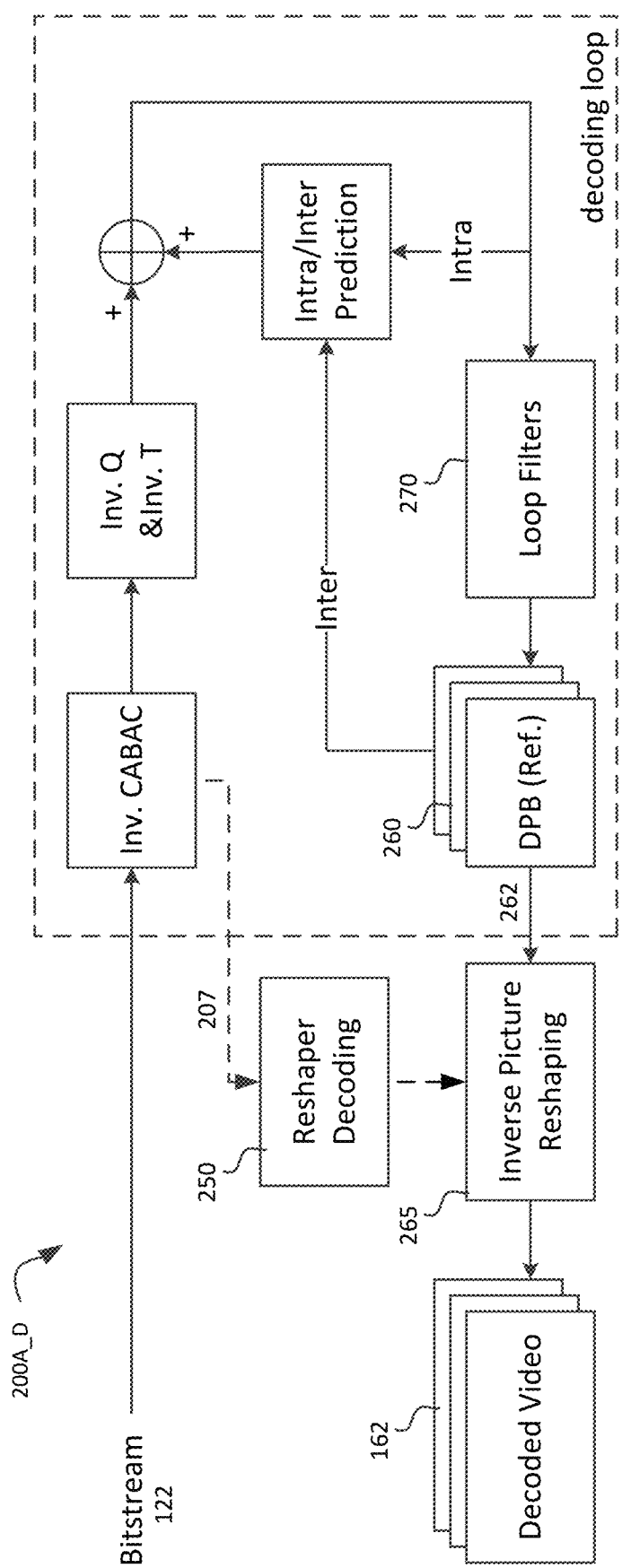
FIG. 2B depicts an example architecture for a decoder using normative out-of-loop reshaping according to an embodiment of this invention.

FIG. 2A and FIG. 2B depict architectures for a video encoder (200A_E) and a corresponding video decoder (200A_D) with a "normative" out-of-loop reshaper. The term "normative" denotes that unlike previous designs where reshaping was considered a pre-processing step, thus outside the normative description of a coding standard, such as AVC, HEVC, and the like, in this embodiment the forward and inverse reshaping are part of the normative requirements. Unlike the architecture of FIG. 1B, where bitstream conformance according to a standard is tested after decoding (130), in FIG. 2B, conformance is tested after the reverse reshaping block (265) (e.g., at output 162 in FIG. 1B).

In the encoder (200A_E), two new blocks are added to a traditional block-based encoder (e.g., HEVC): a block (205) to estimate the forward reshaping function, and the forward picture reshaping block (210), which applies the forward reshaping to one or more of the color components of the input video (117). In some embodiments, these two operations may be performed as part of a single image reshaping block. Parameters (207) related to determining the inverse reshaping function in the decoder may be passed to the lossless encoder block of the video encoder (e.g., CABAC 220) so that they can be embedded into the coded bitstream (122). All operations related to intra or inter-prediction (225), transform and quantization (T &Q), inverse transform and quantization ($Q^{-1}$ & $T^{-1}$) and loop filtering, are performed using reshaped pictures stored in DPB (215).

In the decoder (200A_D), two new normative blocks are added to a traditional block-based decoder: a block (250) to reconstruct an inverse reshaping function based on the encoded reshaping function parameters (207), and a block (265) to apply the inverse reshaping function to the decoded data (262) to generate the decoded video signal (162). In some embodiments, operations related to blocks 250 and 265 may be combined into a single processing block.

Figure 3A:
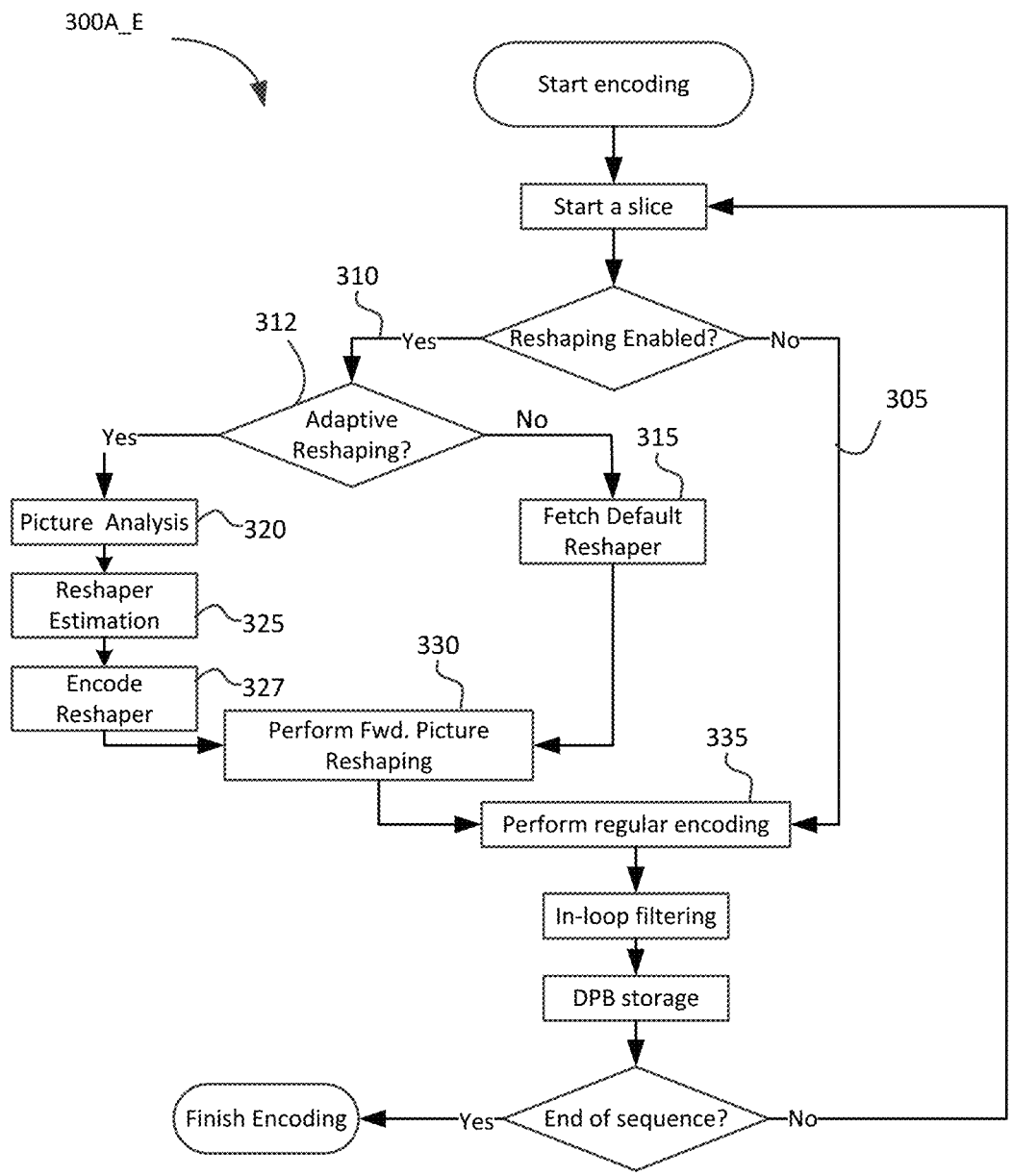
FIG. 3A depicts an example process for encoding video using an out-of-loop reshaping architecture according to an embodiment of this invention.

FIG. 3A depicts an example process (300A_E) for encoding video using the out-of-loop reshaping architecture (200A_E) according to an embodiment of this invention. If there is no reshaping enabled (path 305), then encoding proceeds as known in prior-art encoders (e.g., HEVC). If reshaping is enabled (path 310), then an encoder may have the options to either apply a pre-determined (default) reshaping function (315), or adaptively determine a new reshaping function (325) based on a picture analysis (320) (e.g., as described in references [1]-[3]). Following the forward reshaping (330), the rest of the encoding follows the traditional coding pipeline (335). If adaptive reshaping (312) is employed, metadata related to the inverse reshaping function are generated as part of the "Encode Reshaper" step (327).

Figure 3B:
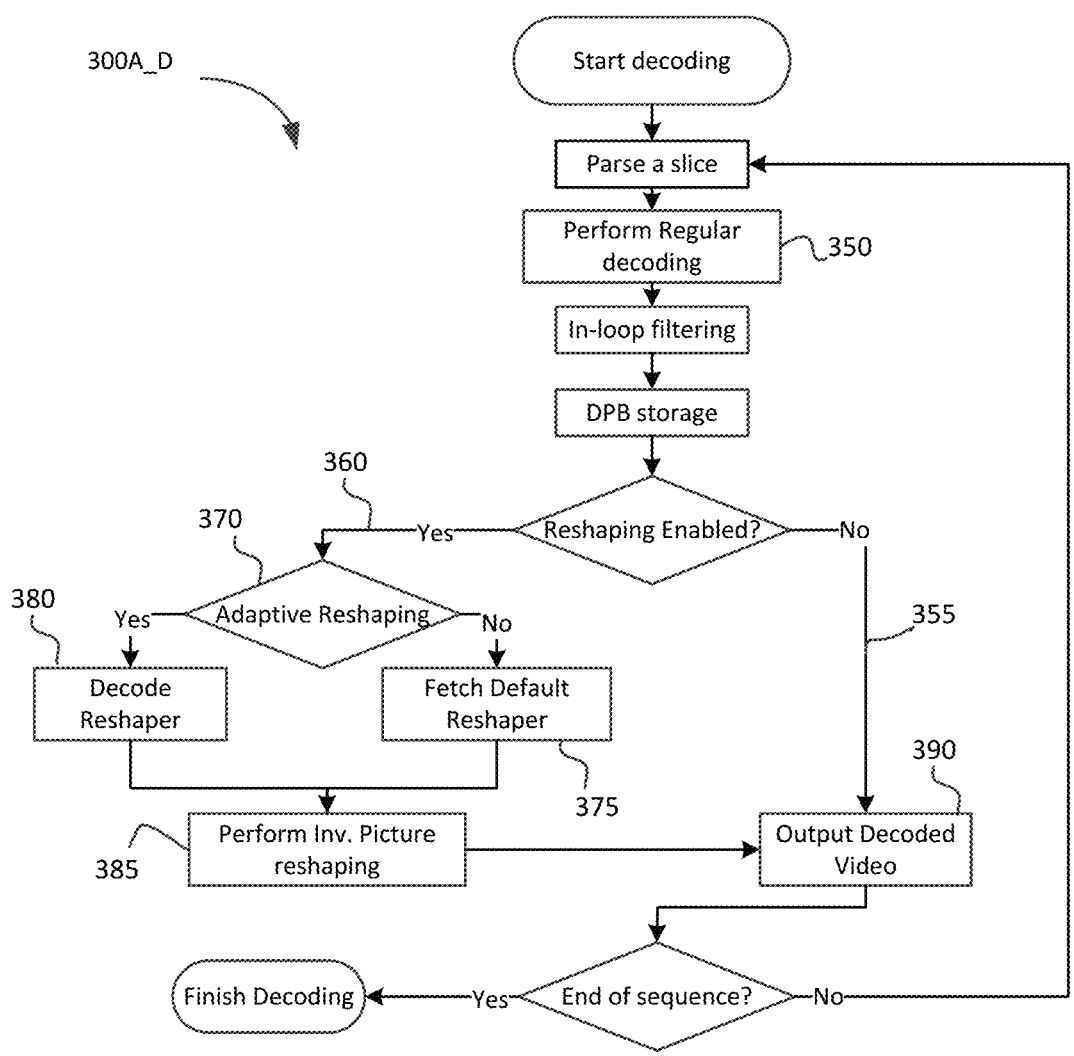
FIG. 3B depicts an example process for decoding video using an out-of-loop reshaping architecture according to an embodiment of this invention.

FIG. 3B depicts an example process (300A_D) for decoding video using the out-of-loop reshaping architecture (200A_D) according to an embodiment of this invention. If there is no reshaping enabled (path 355), then after decoding a picture (350), output frames are generated (390) as in a traditional decoding pipeline. If reshaping is enabled (path 360), then, in step (370), the decoder determines whether to apply a pre-determined (default) reshaping function (375), or adaptively determine the inverse reshaping function (380) based on received parameters (e.g., 207). Following the inverse reshaping (385), the rest of the decoding follows the traditional decoding pipeline.

Normative In-Loop Intra-Only Reshaper

Figure 2C:
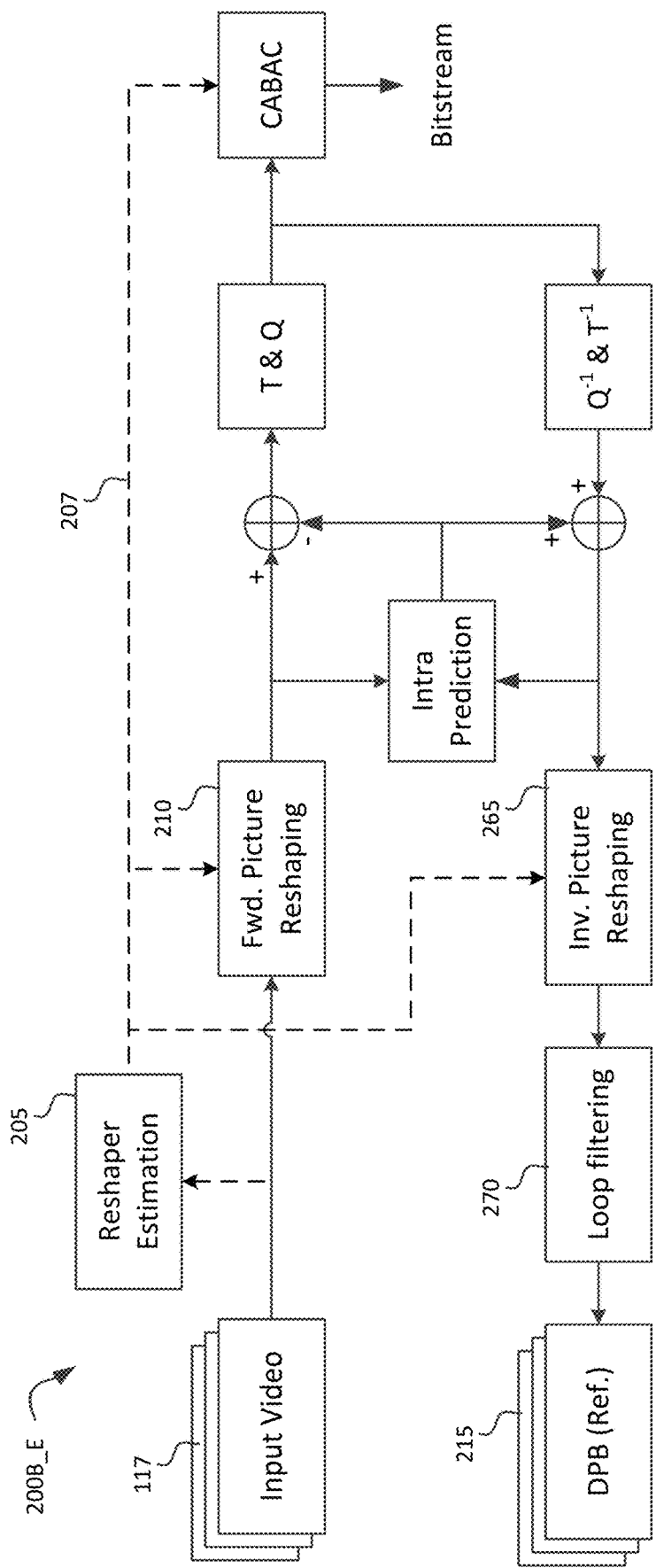
FIG. 2C depicts an example architecture for an encoder using normative Intra-only in-loop reshaping according to an embodiment of this invention.

FIG. 2C depicts an example architecture for an encoder (200B_E) using normative Intra-only in-loop reshaping according to an embodiment of this invention. The design is quite similar to the design proposed in Ref. [1]; however, to reduce complexity, especially at it relates to the use of DPB memory (215 and 260), only intra pictures are encoded using this architecture.

Compared to out-of-loop reshaping (200A_E), the main difference in encoder 200B_E is that DPB (215) stores inverse-reshaped pictures instead of reshaped pictures. In other words, the decoded intra pictures need to be inverse reshaped (by inverse reshaping unit 265) before being stored into the DPB. The reasoning behind this approach is that if intra pictures are coded with reshaping, the improved performance of coding intra pictures will propagate to improve (implicitly) the coding of the inter pictures as well, even though inter pictures are coded without reshaping. In this way, one can take advantage of reshaping without dealing with the complexity of in-loop reshaping for inter pictures. Since inverse reshaping (265) is part of the inner loop, it can be implemented before the in-loop filter (270). The advantage of adding inverse reshaping before the in-loop filter is that in this case the design of the in-loop filter can be optimized based on the characteristics of the original pictures instead of the forward-reshaped pictures.

Figure 2D:
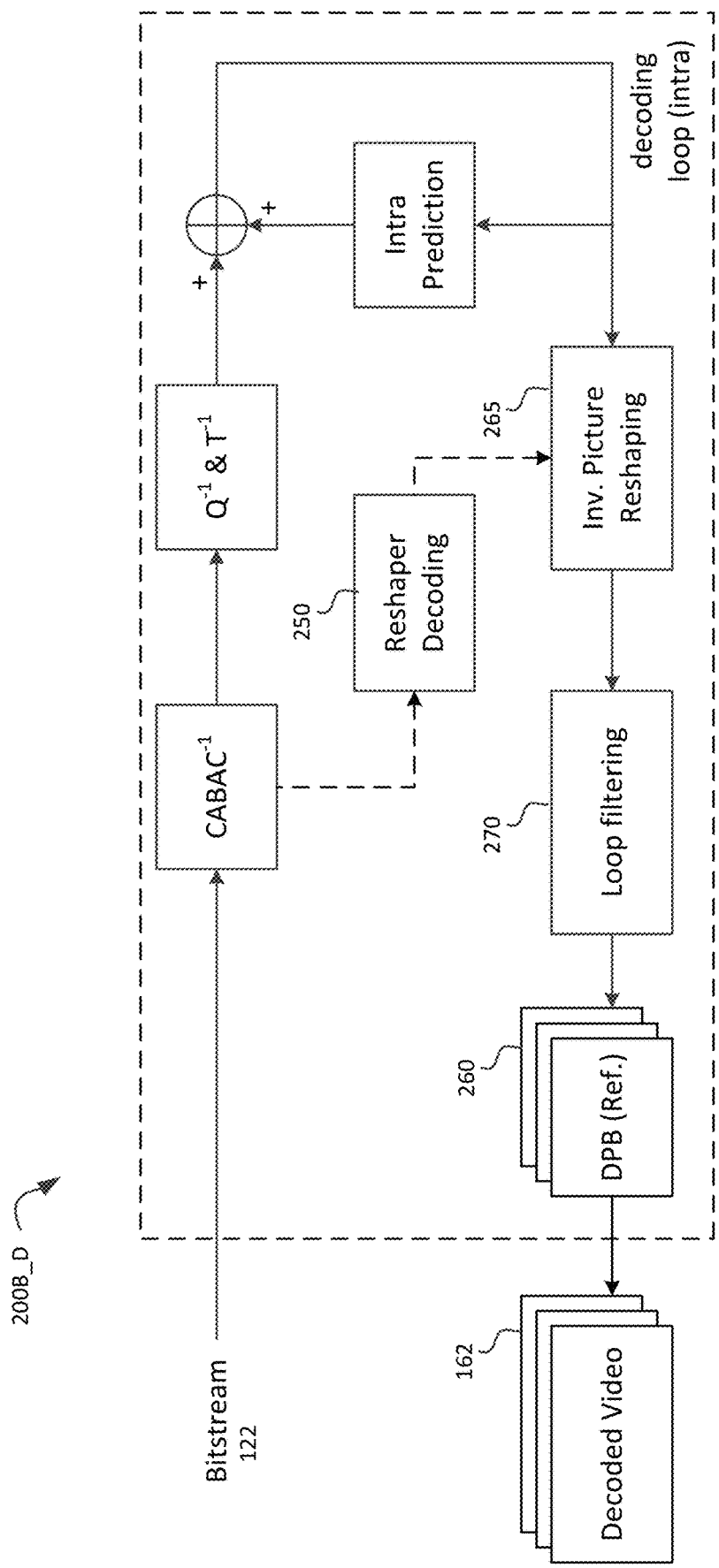
FIG. 2D depicts an example architecture for a decoder using normative Intra-only in-loop reshaping according to an embodiment of this invention.

FIG. 2D depicts an example architecture for a decoder (200B_D) using normative Intra-only in-loop reshaping according to an embodiment of this invention. As depicted in FIG. 2D, determining the inverse reshaping function (250) and applying inverse reshaping (265) are now performed before the in-loop filtering (270).

Figure 3C:
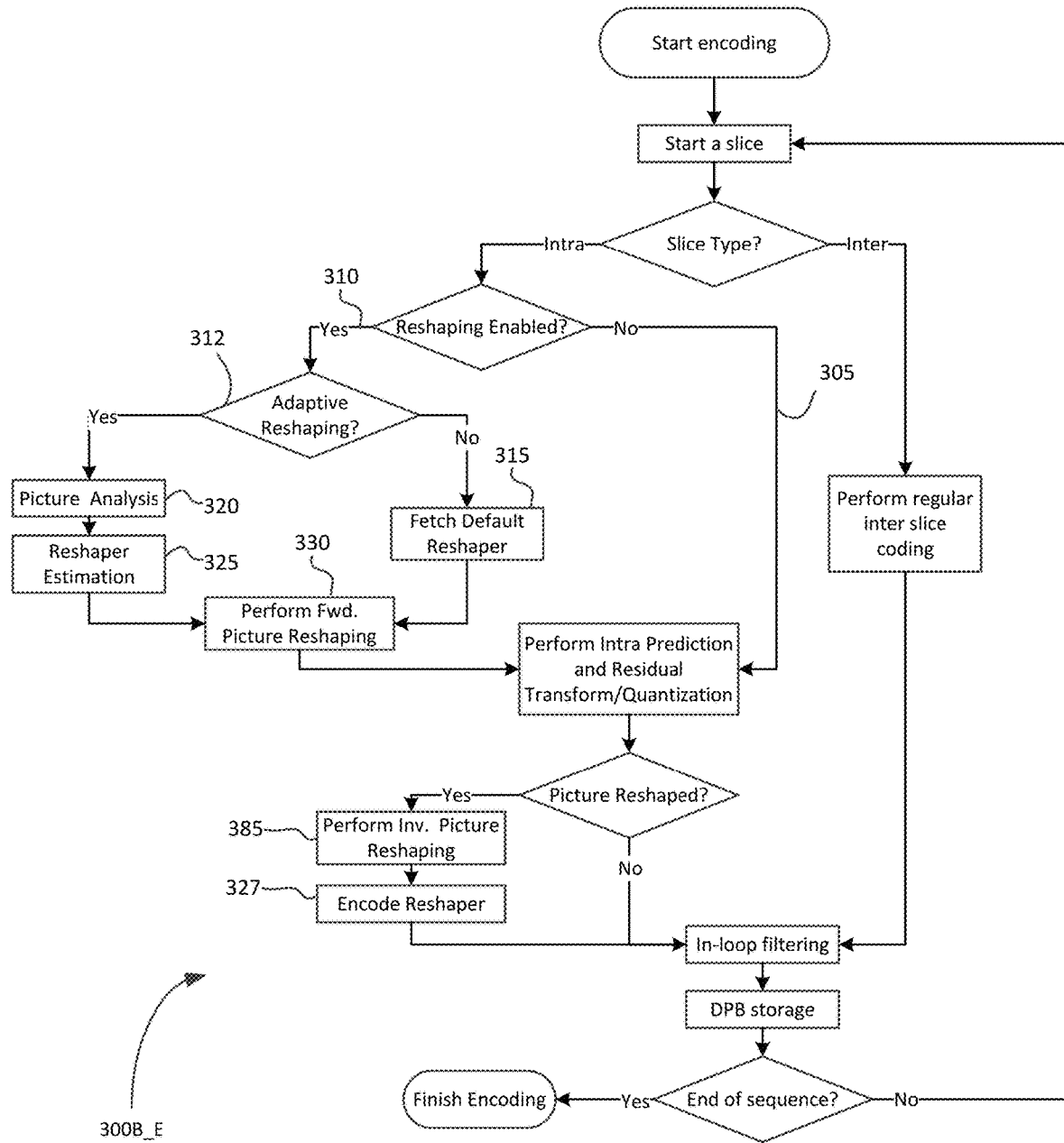
FIG. 3C depicts an example process for encoding video using an in-loop intra-only reshaping architecture according to an embodiment of this invention.

FIG. 3C depicts an example process (300B_E) for encoding video using an in-loop intra-only reshaping architecture according to an embodiment of this invention. As depicted, the flow of operations in FIG. 3C shares many elements with the flow of operations in FIG. 3A. Now, by default, no reshaping is applied for inter-coding. For intra-coded pictures, if reshaping is enabled, an encoder has again the option to use a default reshaping curve or apply adaptive reshaping (312). If a picture is reshaped, inverse reshaping (385) is part of the process and the associated parameters are encoded in step (327). The corresponding decoding process (300B_D) is depicted in FIG. 3D.

Figure 3D:
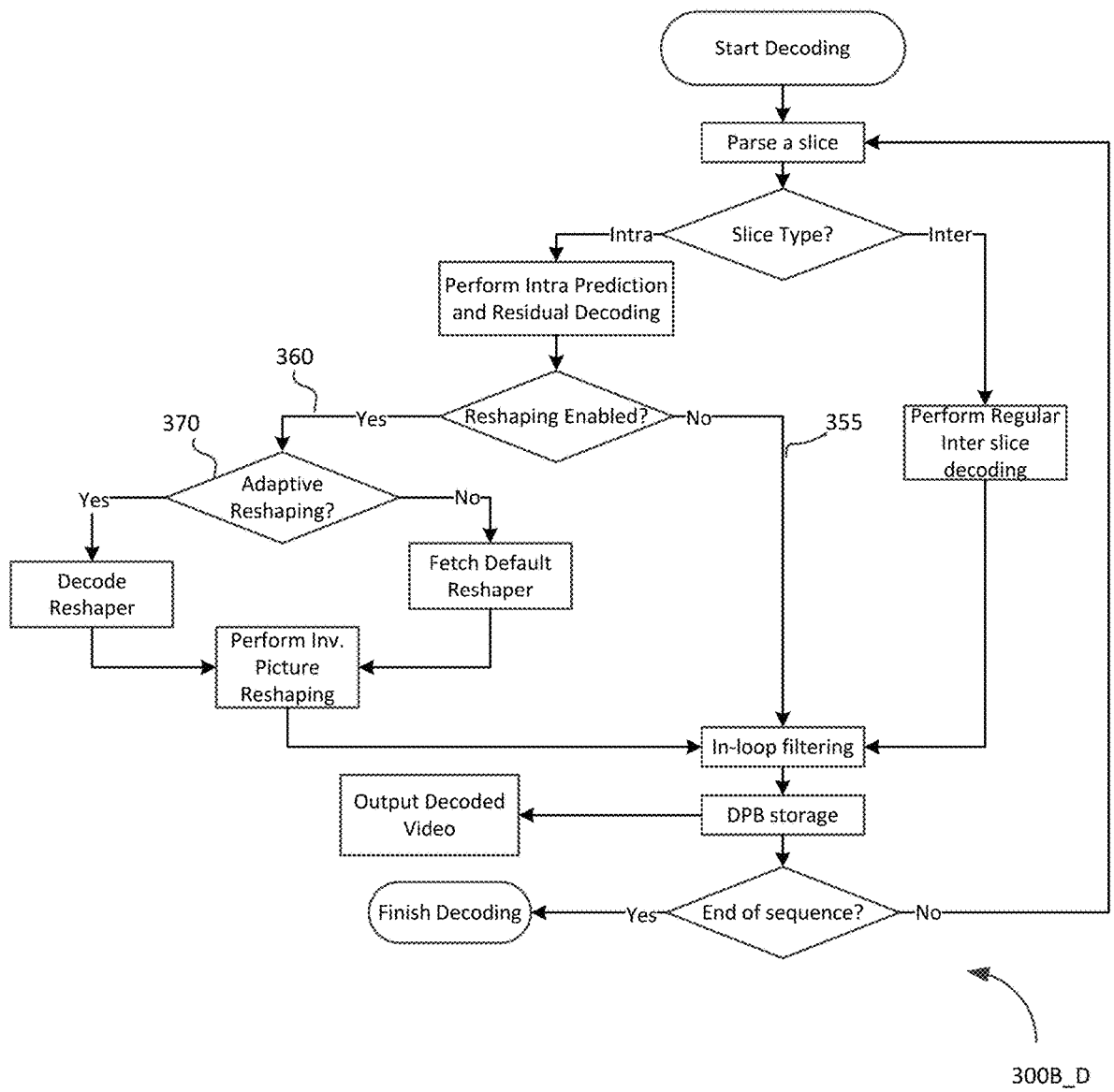
FIG. 3D depicts an example process for decoding video using an in-loop intra-only reshaping architecture according to an embodiment of this invention.

As depicted in FIG. 3D, reshaping related operations are enabled only for received intra pictures and only if intra reshaping was applied on the encoder.

In-Loop Reshaper for Prediction Residuals

In coding, the term 'residual' denotes the difference between a prediction of a sample or data element and its original or decoded value. For example, given an original sample from the input video (117), denoted as Orig_sample, intra or inter prediction (225) may generate a corresponding predicted sample (227) denoted as Pred_sample. If there is no reshaping, the unshaped residual (Res_u) can be defined as $$\text{Res\_u} = \text{Orig\_sample} - \text{Pred\_sample}. \quad (1)$$

Figure 2E:
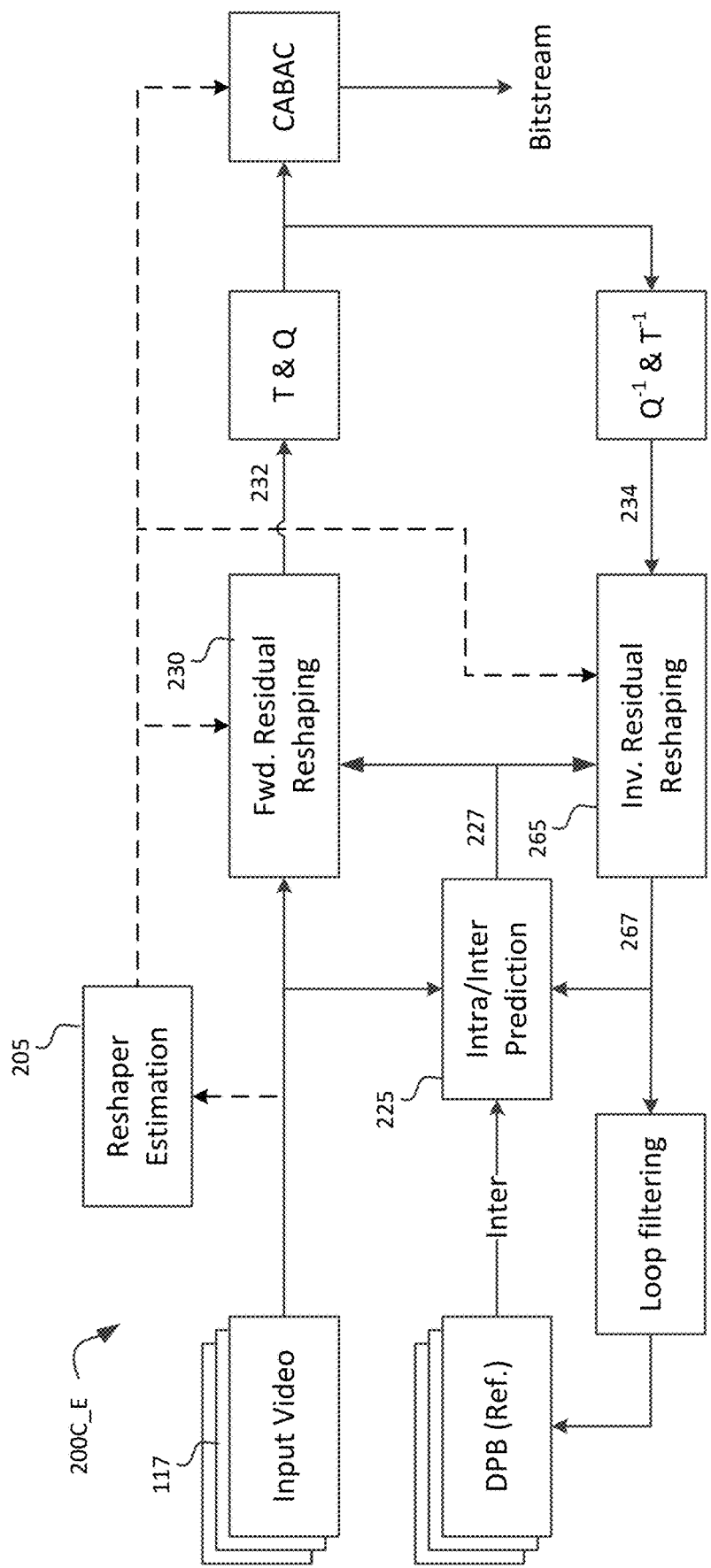
FIG. 2E depicts an example architecture for an encoder using in-loop reshaping for prediction residuals according to an embodiment of this invention.

In some embodiments, it may be beneficial to apply reshaping into the residual domain. FIG. 2E depicts an example architecture for an encoder (200C_E) using in-loop reshaping for predicted residuals according to an embodiment of this invention. Let Fwd( ) denote the forward reshaping function and let Inv( ) denote the corresponding inverse reshaping function. In an embodiment, a reshaped residual (232) may be defined as $$\text{Res\_r} = Fwd(\text{Orig\_sample}) - Fwd(\text{Pred\_sample}). \quad (2)$$

Correspondingly, at the output (267) of the inverse reshaper (265), the reconstructed sample, denoted as Reco_sample (267), may be expressed as $$\text{Reco\_sample} = Inv(\text{Res\_d} + Fwd(\text{Pred\_sample})), \quad (3)$$

where Res_d represents the residual (234), a close approximation of Res_r, after the in-loop coding and decoding in 200C_E.

Figure 2F:
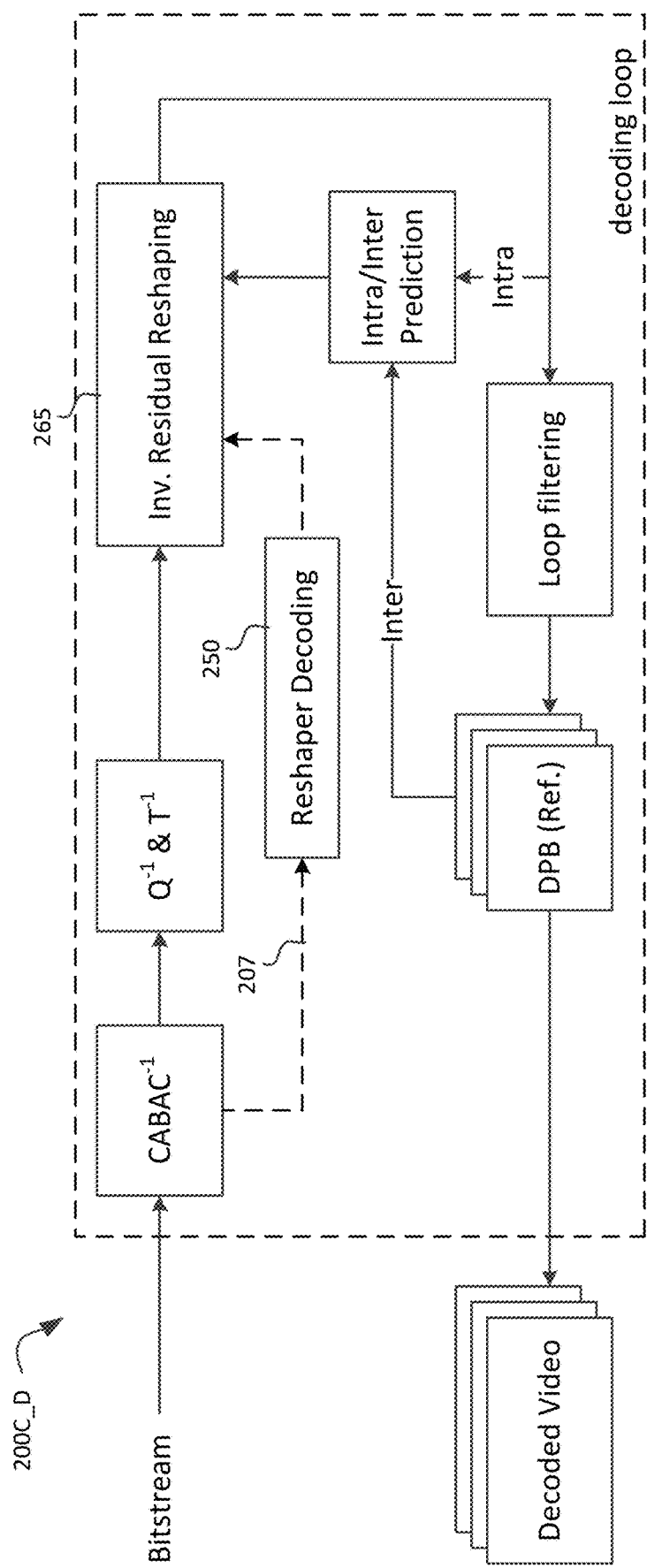
FIG. 2F depicts an example architecture for a decoder using in-loop reshaping for prediction residuals according to an embodiment of this invention.

Note that although reshaping is applied to the residuals, the actual input video pixels are not reshaped. FIG. 2F depicts the corresponding decoder (200C_D). Note that as depicted in FIG. 2F, and based on equation (3), a decoder requires access to both the forward and the inverse reshaping functions, which can be extracted using received metadata (207) and the "Reshaper Decoding" block (250).

In an embodiment, to reduce complexity, equations (2) and (3) may be simplified. For example, assuming that the forward reshaping function can be approximated by a piece-wise linear function and that the absolute difference between Pred_sample and Orig_sample is relatively small, then equation (2) could be approximated as $$\text{Res\_r} = a(\text{Pred\_sample}) * (\text{Orig\_sample} - \text{Pred\_sample}), \quad (4)$$

where a(Pred_sample) denotes a scaling factor based on the value of Pred_sample. From equations (3) and (4), equation (3) can be approximated as $$Reco\_sample = Pred\_sample + (1/a(Pred\_sample)) * Res\_r, \quad (5)$$

Thus, in an embodiment, one needs to communicate to a decoder only the scaling factors a(Pred_sample) for the piecewise linear model.

Figure 3E:
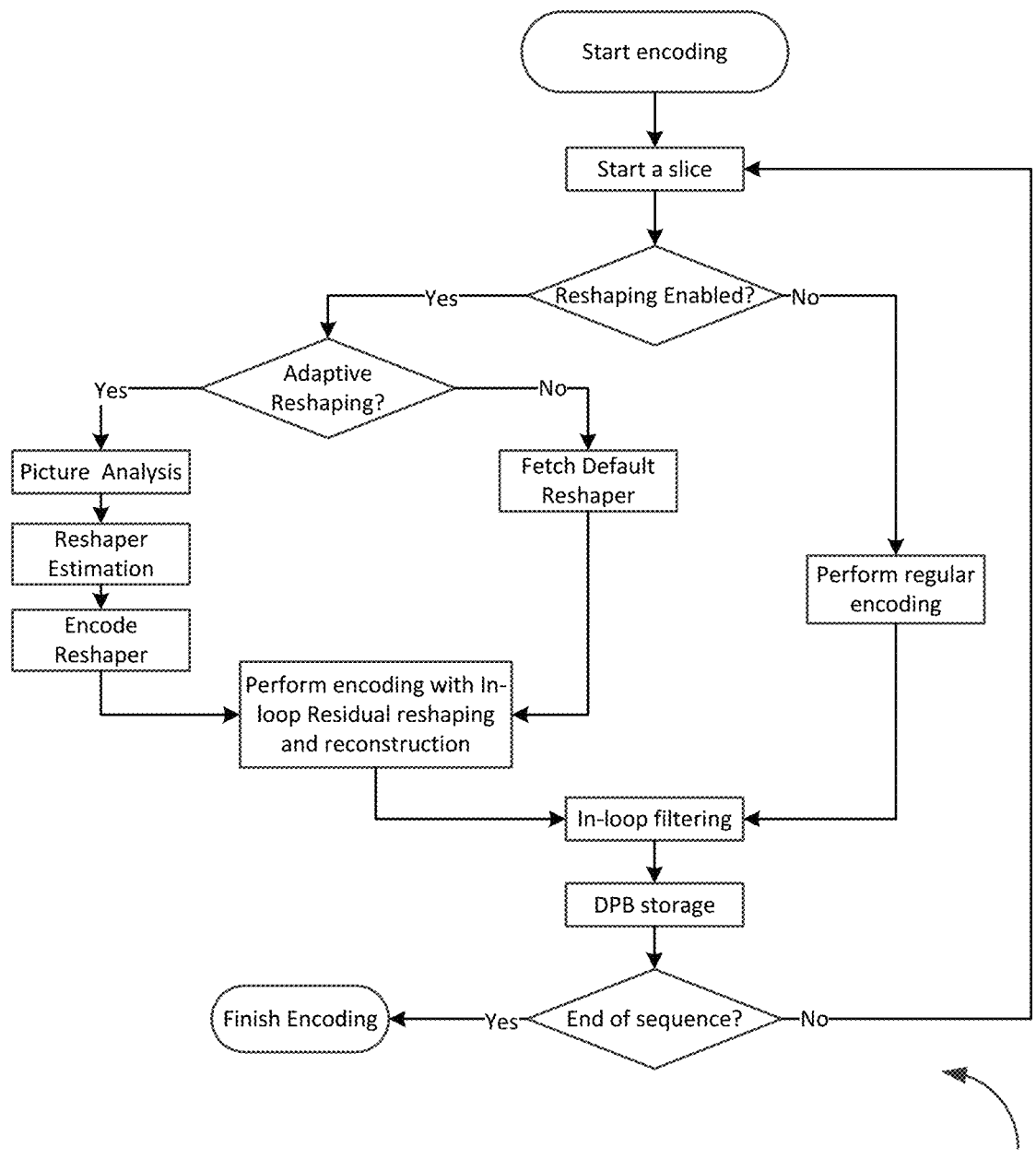
FIG. 3E depicts an example process for encoding video using an in-loop reshaping architecture for prediction residuals according to an embodiment of this invention.
Figure 3F:
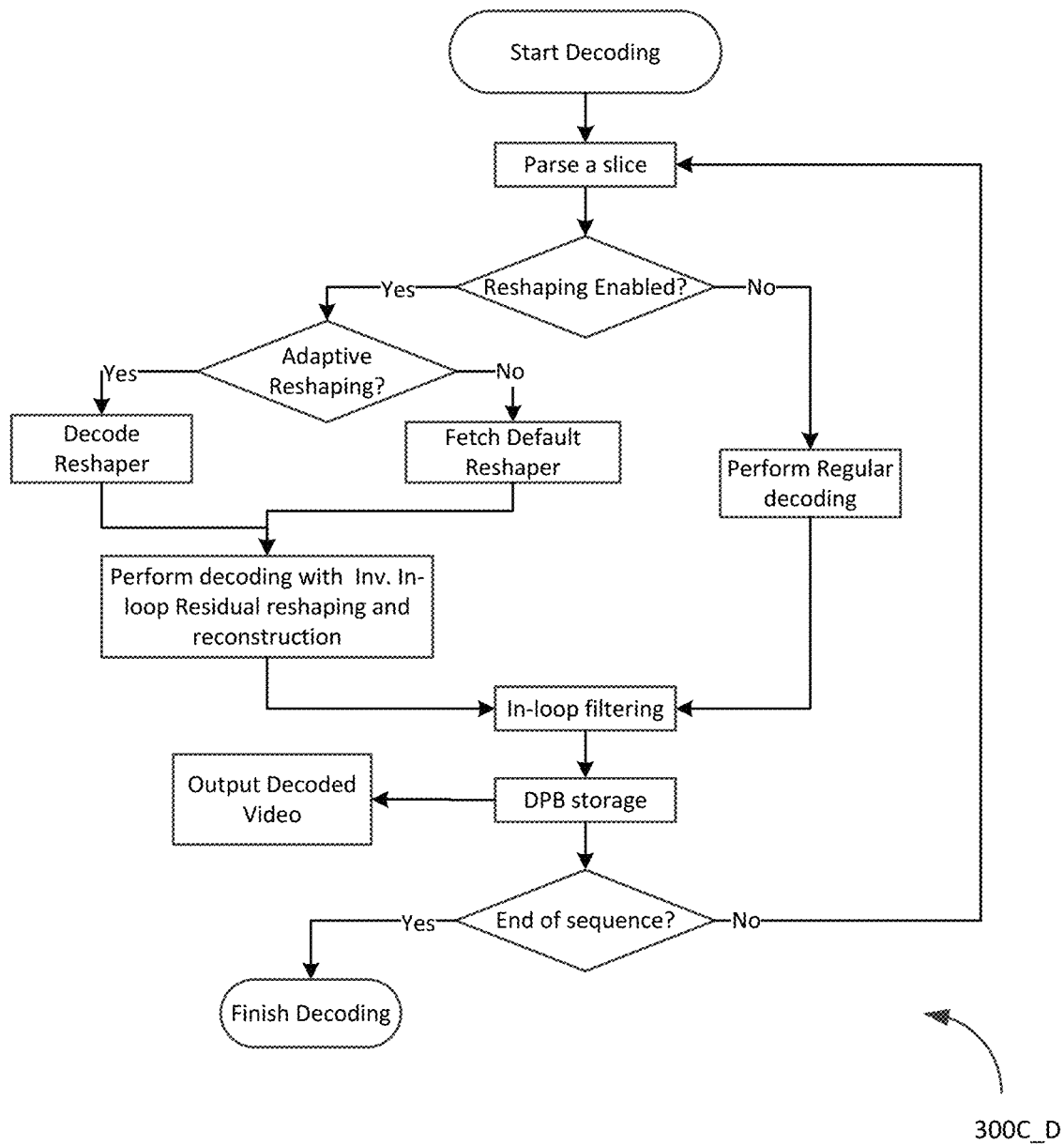
FIG. 3F depicts an example process for decoding video using an in-loop reshaping architecture for prediction residuals according to an embodiment of this invention.

FIG. 3E and FIG. 3F depict example process flows for encoding (300C_E) and decoding (300C_D) a video using in-loop reshaping of prediction residuals. The processes are quite similar with those described in FIGS. 3A and 3B, and, thus, self-explanatory.

Table 1 summarizes the key features of the three proposed architectures.

Figure 4A:
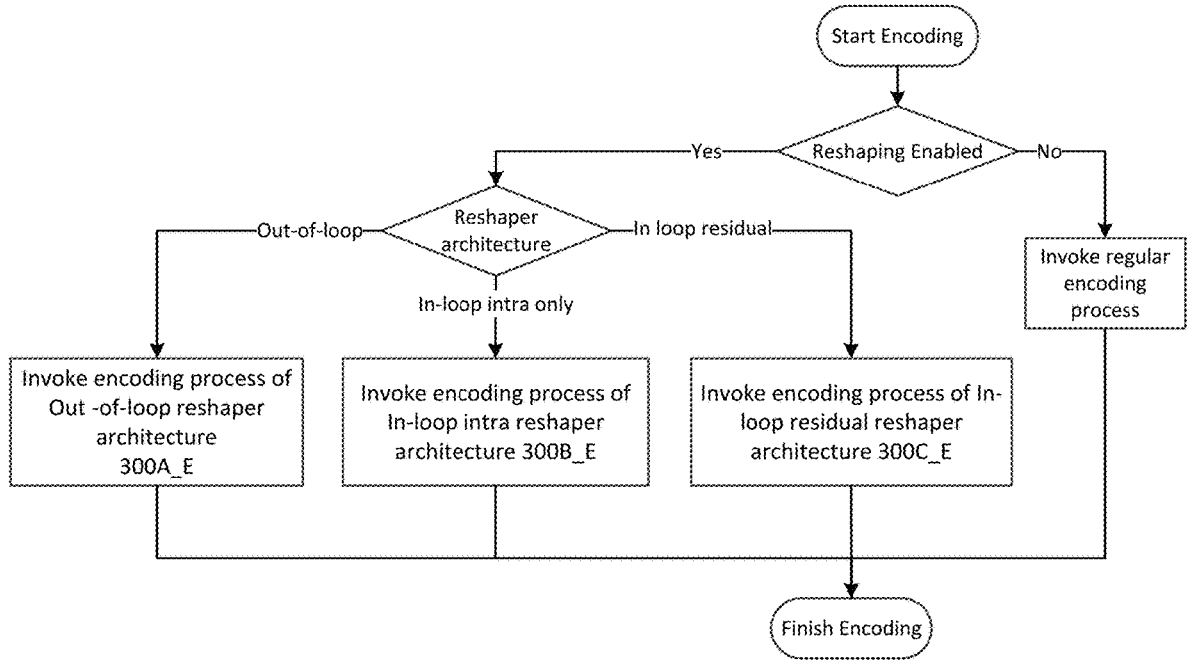
FIG. 4A depicts an example process for encoding video using any one, or a combination of three reshaping-based architectures according to an embodiment of this invention.
Figure 4B:
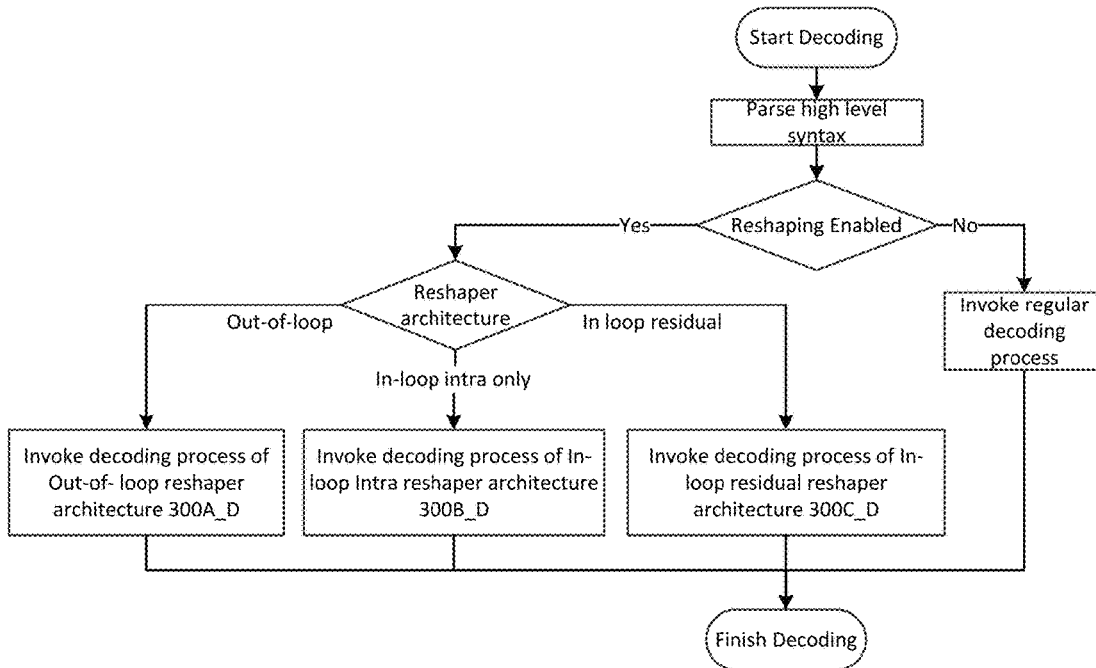
FIG. 4B depicts an example process for decoding video using any one, or a combination, of three reshaping-based architectures according to an embodiment of this invention.

FIG. 4A and FIG. 4B depict example encoding and decoding processing flows for encoding and decoding using a combination of the three proposed architectures. As depicted in FIG. 4A, if reshaping is not enabled, the input video is encoded according to known video coding techniques (e.g., HEVC and the like) without using any reshaping. Otherwise, the encoder may select any one of the three main proposed methods, depending on the capabilities of the target receiver and/or the input characteristics. For example, in an embodiment, an encoder could switch between these methods at the scene level, where a 'scene' is denoted as a sequence of continuous frames with similar luminance characteristics. In another embodiment, high level parameters are defined in the Sequence Parameter Set (SPS) level.

As depicted in FIG. 4B, a decoder, depending on received signaling of the reshaping information, can invoke any of the corresponding decoding processes to decode the incoming coded bitstream.

Hybrid In-Loop Reshaping

Figure 2G:
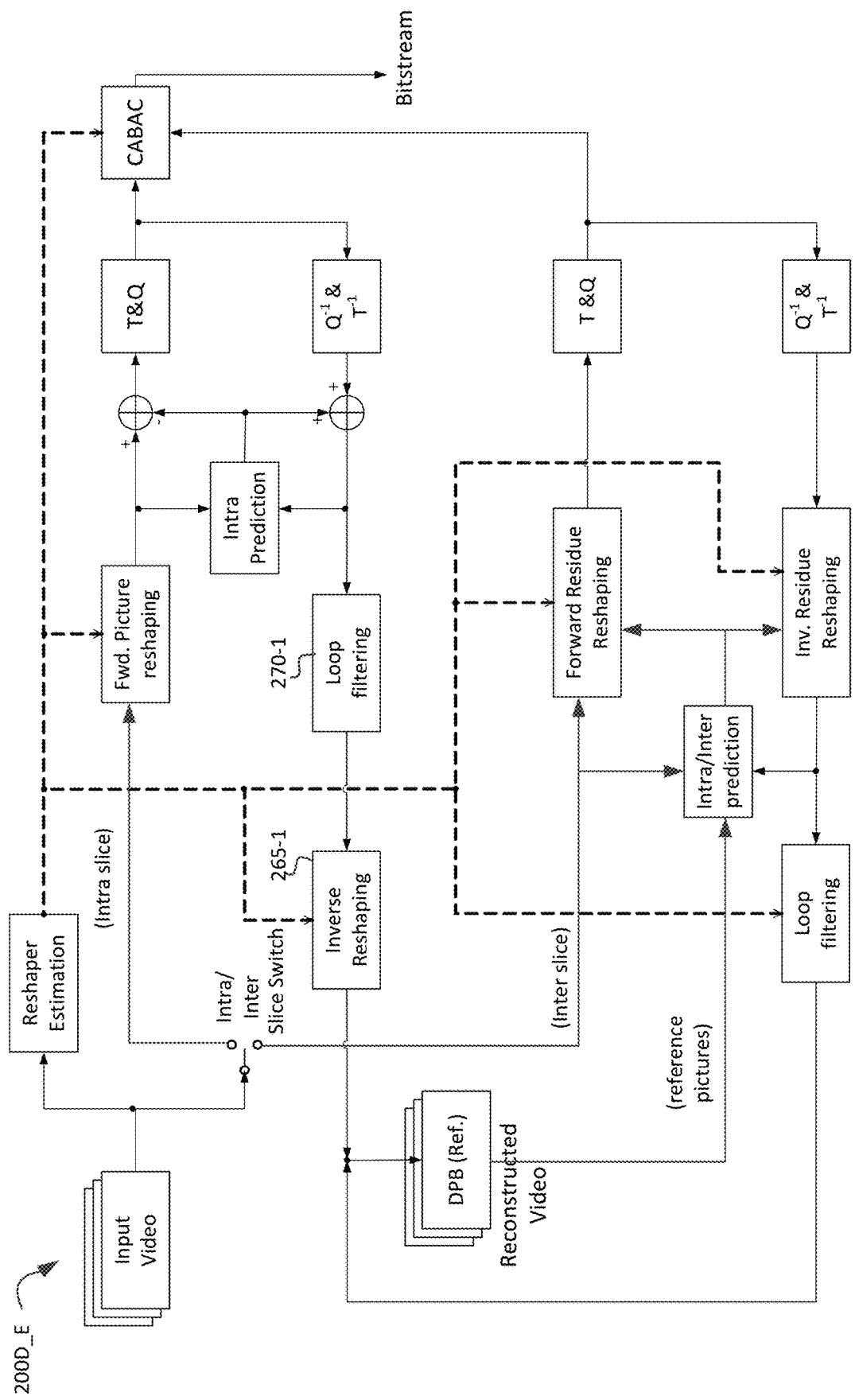
FIG. 2G depicts an example architecture for an encoder using hybrid in-loop reshaping according to an embodiment of this invention.

FIG. 2G depicts an example architecture (200D_E) for an encoder using a hybrid in-loop reshaping architecture. This architecture combines elements from both the in-loop intra only reshaping (200B_E) and the in-loop residual (200C_E) architectures discussed earlier. Under this architecture, Intra slices are encoded according to the in-loop intra reshaping encoding architecture (e.g., 200B_E in FIG. 2C), except for one differentiation: for Intra slices, inverse picture reshaping (265-1) is performed after the loop filtering (270-1). In another embodiment, in-loop filtering for Intra slices may be performed after inverse reshaping; however, experimental results have shown that such an arrangement may yield worse coding efficiency than when inverse reshaping is performed after loop filtering. The remaining operations remain the same as discussed earlier.

Inter slices are encoded according to the in-loop residual encoding architecture (e.g., 200C_E in FIG. 2E), as discussed earlier. As depicted in FIG. 2G, an Intra/Inter Slice switch allows switching between the two architectures depending on the slice type to be encoded.

Figure 2H:
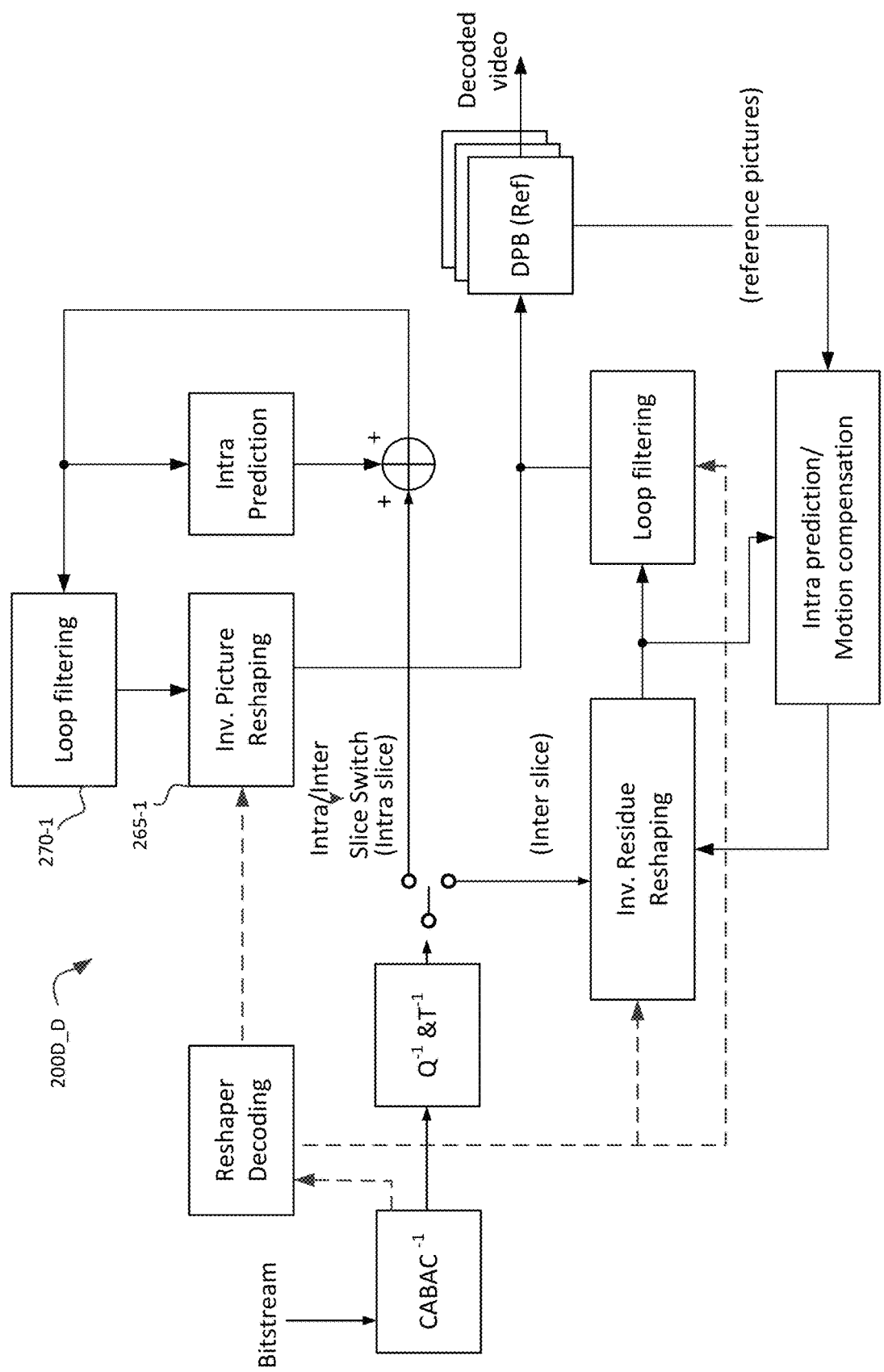
FIG. 2H depicts an example architecture for a decoder using hybrid in-loop reshaping according to an embodiment of this invention.

FIG. 2H depicts an example architecture (200D_D) for a decoder using a hybrid in-loop reshaping. Again, Intra slices are decoded according to the in-loop intra reshaping decoder architecture (e.g., 200B_D in FIG. 2D), where again, for

TABLE 1

Key features reshaping architectures under consideration

| | architecture | | |
|---|---|---|---|
| | Out-of-Loop | In-Loop Intra only | In-Loop Residual |
| DPB storage | reshaped pictures | Intra mode: inv.-reshaped pictures<br>Inter mode: no reshaping | non-reshaped pictures |
| intra prediction performed on | reshaped pictures | reshaped pic | non-reshaped pictures |
| inter prediction (motion estimation) performed on | reshaped pictures | non-reshaped pictures | non-reshaped pictures |
| extra pic buffer needed | yes (need buffer to hold reshaped pictures in DPB and non-reshaped pictures for output) | no (on the fly replacement of picture samples) | no (on the fly replacement of residual samples) |
| Place/Frequency of adaptive reshaping estimation | unrestricted (can be intra only, scene-based, or configurable | on intra-pictures only | unrestricted (can be intra only, scene-based, or configurable) |
| complexity for sample modification (reshaping) | process all pictures | process only intra-pictures (lowest complexity) | process residuals, no matter intra or inter |
| loop filter interaction | optimization using reshaped picture as reference | optimization using original picture as reference | optimization using original picture as reference |
| adaptive, block/region-level reshaping possible | no | no | yes |
| other aspects | inter prediction performance may suffer if reference frames have different reshaping functions | | inter prediction can use reshaper for current pic to process residuals against reference frames (which may have different reshaper themselves) |
| | decoder side needs inverse reshaping function only | decoder side needs inverse reshaping function only | decoder needs both the forward and the inverse reshaping functions | intra slices, loop filtering (270-1) precedes inverse picture reshaping (265-1). Inter slices are decoded according to the in-loop residual decoding architecture (e.g., 200C_D in FIG. 2F). As depicted in FIG. 2H, an Intra/Inter Slice switch allows switching between the two architectures depending on the slice types in the encoded video pictures.

FIG. 4A can easily be extended to also include the hybrid in-loop reshaping encoding method by invoking the encoding process 300D-E depicted in FIG. 2G. Similarly, FIG. 4B can easily be extended to also include the hybrid in-loop reshaping decoding method by invoking the decoding process 300D-D depicted in FIG. 2H.

Reshaping at the Slice Level

Embodiments of the present invention allow for a variety of slice-level adaptations. For example, to reduce computations, reshaping may be enabled only for intra slices or only for inter slices. In another embodiment, reshaping may be allowed based on the value of a temporal ID (e.g., variable TemporalId of HEVC (Ref. [11]), where TemporalId=nuh_temporal_id_plus1−1). For example, if TemporalId for the current slice is less than or equal to a predefined value, then the slice_reshaper_enable_flag for the current slice may be set to 1, otherwise, slice_reshaper_enable_flag will be 0. To avoid sending the slice_reshaper_enable_flag parameter for each slice, one can specify the sps_reshaper_temporal_id parameter at the SPS level, thus its value can be inferred.

For slices where reshaping is enabled, the decoder needs to know which reshaping model to be used. In one embodiment, it may always use the reshaping model defined at the SPS level. In another embodiment, it may always use the reshaping model defined in the slice header. If no reshaping model is defined in the current slice, then it may apply the reshaping model used in the most recently decoded slice which used reshaping. In another embodiment, the reshaping model may always be specified in Intra slices, regardless of whether reshaping is used for an intra slice or not. In such an implementation, the parameters slice_reshaper_enable_flag and slice_reshaper_model_present_flag need to be decoupled. An example of such a slice syntax is depicted in Table 5.

Signaling of Reshaping Information

Information related to forward and/or inverse reshaping may be present at different information layers, e.g., at the video parameter set (VPS), the sequence parameter set (SPS), the picture parameter set (PPS), a slice header, supplemental information (SEI), or any other high-level syntax. As an example, and without limitation, Table 2 provides an example of high-level syntax in the SPS for signaling on whether reshaping is enabled, whether reshaping is adaptive or not, and which of the three architectures is being used.

Additional information may also be carried at some other layer, say in the slice header. The reshaping functions can be described by look-up tables (LUT), piecewise polynomials, or other kinds of parametric models. The type of reshaping model being used to communicate the reshaping functions can be signaled by additional syntax elements, e.g., a reshaping_model_type flag. For example, consider a system that uses two distinct representations: model_A (e.g., reshaping_model_type=0) represents the reshaping function as a set of piecewise polynomials (e.g., see Ref. [4]), while in model_B (e.g., reshaping_model_type=1) the reshaping function is derived adaptively by assigning codewords to different luminance bands based on picture luminance characteristics and visual importance (e.g., see Ref. [3]). Table 3 provides an example of syntax elements in the slice header of a picture to assist a decoder to determine the proper reshaping model being used.

TABLE 3

Example syntax for reshaping signaling in a slice header

| | Descriptor |
|---|---|
| slice_segment_header( ) | |
| ...... | |
|   if (sps_reshaper_adaptive_flag) { | |
|     reshaping_model_type | ue(v) |
|     if (reshaping_model_type == model_A) { | |
|       reshaping_sliceheader_table_model_A( ) | |
|     } | |
|     else if (reshaping_model_type == model_B) { | |
|       reshaping_sliceheader_table_model_B( ) | |
|     } | |
|     else ... | |
|   } | |
| ...... | |

The following three Tables describe alternative examples of a bitstream syntax for signal reshaping at the Sequence, Slice, or Coding Tree Unit (CTU) layers.

TABLE 2

Example of reshaping information in SPS

| | | Descriptor |
|---|---|---|
| SPS( ) | | |
| ...... | | |
|   sps_reshaper_enable_flag | /*1: reshaping on, else off */ | u(1) |
|   if (sps_reshaper_enable_flag) { | | |
|     sps_reshaper_adaptive_flag | /* 1: adaptive reshaping is on, else off */ | u(1) |
|     sps_reshaper_architecture | /* e.g.: 0: out-of-loop, 1:in-loop intra, 2: in-loop residual */ | ue(v) |
|   } | | |
| ...... | | |

TABLE 4

Example of reshaping information in SPS

| | Descriptor |
|---|---|
| SPS( ) | |
| ...... | |
|   sps_reshaper_enable_flag    /*1: reshaping on, else off */ | u(1) |
|   if (sps_reshaper_enable_flag) { | |
|     sps_reshaper_signal_type    /* 0:SDR, 1:PQ, 2:HLG */ | u(2) |
|     sps_reshaper_ILF_opt    /* loop filter in which domain: 2 bits inter/intra */ | u(2) |
|     sps_reshaper_chromaAdj    /* 1: chromaDQP; 2: chroma scaling/ | u(2) |
|     sps_reshaper_model_present_flag /*1: present*/ | u(1) |
|     if (sps_reshaper_model_present_flag) | |
|       sps_reshaper_model ( ) | |
|   } | |

TABLE 5

Example syntax for reshaping signaling in a slice header

| | Descriptor |
|---|---|
| slice_header( ) | |
| ...... | |
| slice_reshaper_model_present_flag | u(1) |
|   if ( slice_reshaper_model_present_flag ) | |
|     slice_reshaper_model ( ) | |
| slice_reshaper_enable_flag | u(1) |
| if ( slice_reshaper_enable_flag ) { | |
|   reshaper_CTU_control_flag /*1: on, CTU level on/off flag*/ | u(1) |
| } | |
| ...... | |

TABLE 6

Example syntax for reshaping signaling in a CTU

| | Descriptor |
|---|---|
|   coding_tree_unit( ) | |
|   ...... | |
|   if ( reshape_CTU_control_flag ) { | |
|     reshaper_CTU_flag | ae(v) |
|   } | |
|   ...... | |

For Tables 4-6, example semantics can be denoted as:

sps_reshaper_enable_flag equal to 1 specifies that reshaper is used in the coded video sequence (CVS). sps_reshaper_enabled_flag equal to 0 specifies that reshaper is not used in the CVS.

slice_reshaper_enable_flag equal to 1 specifies that reshaper is enabled for the current slice. slice_reshaper_enable_flag equal to 0 specifies that reshaper is not enabled for the current slice.

sps_reshaper_signal_type indicates the original codewords distribution or representation. As an example, and without limitation, sps_reshaper_signal_type equal to 0 specifies SDR (gamma); sps_reshaper_signal_type equal to 1 specifies PQ; and sps_reshaper_signal_type equal to 2 specifies HLG.

reshaper_CTU_control_flag equal to 1 indicate that reshaper is allowed to be adapted for each CTU. reshaper_CTU_control_flag equal to 0 indicate that reshaper is not allowed to be adapted for each CTU. When reshaper_CUT_control_flag is not present, the value shall be inferred to be 0.

reshaper_CTU_flag equal to 1 specifies that reshaper is used for the current CTU. reshaper_CUT_flag equal to 0 specifies that reshaper is not used for the current CTU. When reshaper_CTU_flag is not present, the value shall be inferred to equal to slice_reshaper_enabled_flag.

sps_reshaper_model_present_flag equal to 1 indicates sps_reshaper_model( ) is present in sps. sps_reshaper_model_present_flag equal to 0 indicates sps_reshaper_model( ) is not present in SPS.

slice_reshaper_model_present_flag equal to 1 indicates slice_reshaper_model( ) is present in slice header. slice_reshaper_model_present_flag equal to 0 indicates slice_reshaper_model( ) is not present in SPS.

sps_reshaper_chromaAdj equal to 1 indicates that chroma QP adjustment is done using chromaDQP. sps_reshaper_chromaAdj equal to 2 indicates that chroma QP adjustment is done using chroma scaling.

sps_reshaper_ILF_opt indicates whether the in-loop filter should be applied in the original domain or the reshaped domain for intra and inter slices. For example, using a two-bit syntax, where the least significant bit refers to intra slices:

| sps_reshaper_ILF_opt | In-loop filter operations |
|---|---|
| 0 0 | In original domain for both intra and inter |
| 0 1 | In original domain for inter, in reshaped domain for intra |

-continued

| sps_reshaper_ILF_opt | In-loop filter operations |
|---|---|
| 1 0 | In reshaped domain for inter, in original domain for intra |
| 1 1 | In reshaped domain for both intra and inter |

In some embodiments, this parameter may be adjusted at the slice level. For example, in an embodiment, a slice may include a slice_reshape_ILFOPT_flag when slice_reshaper_enable_flag is set to 1. In another embodiment, in SPS, one may include an sps_reshaper_ILF_Tid parameter if sps_reshaper_ILF_opt is enabled. If TemporalID for current slice<=sps_reshaper_ILF_Tid and slice_reshaper_enable_flag is set to 1, then the In-loop Filter is applied in reshaping domain. Otherwise, it is applied in the non-reshaped domain.

In Table 4, chroma QP adjustment is controlled at the SPS level. In an embodiment, chroma QP adjustment may also be controlled at the slice level. For example, in each slice, one may add the syntax element slice_reshape_chromaAdj_flag when slice_reshaper_enable_flag is set to 1. In another embodiment, in SPS, one may add the syntax element sps_reshaper_ChromaAdj_Tid if sps_reshaper_chromaAdj is enabled. If TemporalID for current slice<=sps_reshaper_ChromaAdj_Tid and slice_reshaper_enable_flag is set to 1, then chroma adjustment is applied. Otherwise, chroma adjustment is not applied. Table 4B depicts an example variation of Table 4 using the syntax described earlier.

TABLE 4B

Example syntax for reshaping signaling in SPS using temporal IDs

| | Descriptor |
|---|---|
| SPS( ) | |
| ...... | |
| sps_reshaper_enable_flag   /*1: reshaping on, else off */ | u(1) |
| if (sps_reshaper_enable_flag) { | |
|   sps_reshaper_signal_type   /* 0:HDR, 1:PQ, 2:HLG */ | u(2) |
|   sps_reshaper_ILF_opt   /* loop filter in which domain: 2 bits inter/intra */ | u(2) |
|   if ( sps_reshaper_ILF_opt == 3) | |
|     sps_reshaper_ILF_Tid | u(3) |
|   sps_reshaper_chromaAdj   /* 1: chromaDQP; 2: chromaScaling/ | u(2) |
|   if ( sps_reshaper_chromaAdj ) | |
|     sps_reshaper_chromaAdj_Tid | u(3) |
|   sps_reshaper_model_present_flag /*1: present*/ | u(1) |
|   if (sps_reshaper_model_present_flag) | |
|     sps_reshaper_model ( ) | |
| } | | sps_reshaper_ILF_Tid specifies the highest TemporalID where in-loop filter is applied for a reshaped slice in the reshaped domain.

sps_reshaper_chromaAdj_Tid specifies the highest TemporalID for which chroma adjustment is applied for a reshaped slice.

In another embodiment, the reshaping model may be defined using a reshape-model ID, e.g., reshape_model_id, for example, as part of the slice_reshape_model( ) function. The reshaping model can be signaled at the SPS, PPS, or slice-header levels. If signaled in SPS or PPS, the value of the reshape_model_id can also be inferred from sps_seq_parameter_set_id or pps_pic_parameter_set_id. An example of how to use reshape_model_id for slices which do not carry slice_reshape_model( ) (e.g., slice_reshaper_model_present_flag equal to 0) is shown below in Table 5B, a variation of Table 5.

TABLE 5B

Example syntax for reshaping signaling in a slice header using reshape_model_id

| | Descriptor |
|---|---|
| slice_header( ) | |
| ...... | |
|   slice_reshaper_model_present_flag | u(1) |
|   if ( slice_reshaper_model_present_flag ) | |
|     slice_reshaper_model ( ) | |
|   else | |
|     reshape_model_id | ue(v) |
|   slice_reshaper_enable_flag | u(1) |
|   if ( slice_reshaper_enable_flag ) { | |
|     reshaper_CTU_control_flag /*1: on, CTU level on/off flag*/ | u(1) |
|   } | |
| ...... | |

In example syntax, the parameter reshape_model_id specifies the value for the reshape_model being used. The value of reshape_model_id shall be in the range of 0 to 15.

As an example of using the proposed syntax, consider an HDR signal coded using the PQ EOTF, where reshaping is used at the SPS level, no specific reshaping is used at the slice level (reshaping is used for all slices), and CTU adaptation is allowed only for Inter slices. Then:

```
sps_reshaper_signal_type = 1 (PQ);
sps_reshaper_model_present_flag = 1;
// Note: One can manipulate the slice_reshaper_enable_flag to enable
and disable reshaper for inter slices.
slice_reshaper_enable_flag = 1;
if (CTUAdp)
{
  if (I_slice)
    slice_reshaper_model_present_flag = 0;
    reshaper_CTU_control_flag = 0;
  else
    slice_reshaper_model_present_flag = 0;
    reshaper_CTU_control_flag = 1;
}
else
{
```

```
    slice_reshaper_model_present_flag = 0;
    reshaper_CTU_control_flag = 0;
}
```

In another example, consider an SDR signal where reshaping is applied only at the slice level, and only for Intra slices. CTU reshaping adaptation is allowed only for Inter slices. Then:

```
    sps_reshaper_signal_type = 0 (SDR);
    sps_reshaper_model_present_flag = 0;
    slice_reshaper_enable_flag    = 1;
    if (I_slice)
    {
       slice_reshaper_model_present_flag = 1;
       reshaper_CTU_control_flag = 0;
    }
    else
    {
       slice_reshaper_model_present_flag = 0;
       if (CTUAdp)
          reshape_CTU_control_flag = 1;
       else
          reshaper_CTU_control_flag = 0;
    }
```

At the CTU level, in an embodiment, CTU-level reshaping may be enabled based on the luminance characteristics of the CTU. For example, for each CTU, one may compute the average luminance (e.g., CTU_avg_lum_value), compare it with one or more thresholds, and decide whether to turn reshaping on or off based on the results of those comparisons. For example,

```
       if CTU_avg_lum_value < THR1, or
       if CTU_avg_lum_value > THR2, or
       if THR3<CTU_avg_lum_value<THR4,
          then reshaper_CTU_Flag = 1 for this CTU.
```

In an embodiment, instead of using the average luminance, one may use some other luminance characteristic of the CTU, such as the minimum, maximum, or average luminance, variance, and the like. One may also apply chroma-based characteristics of the CTU, or one may combine luminance and chroma characteristics and thresholds.

As described earlier (e.g., in relation to the steps in FIGS. 3A, 3B, and 3C), embodiments may support both a default or static reshaping function, or adaptive reshaping. A "default reshaper" can be used to perform a pre-defined reshaping function, therefore reducing the complexity for analyzing each picture or scene in deriving a reshaping curve. In this case, there is no need for signaling an inverse reshaping function at the scene, picture, or slice level. The default reshaper can be implemented by either using a fixed mapping curve stored in the decoder to avoid any signaling, or it can be signaled once as part of the sequence level parameter sets. In another embodiment, a previously decoded adaptive reshaping function could be re-used for later pictures in coding order. In another embodiment, reshaping curves may be signaled in a differential way against previously decoded ones. In other embodiments, (for example for in-loop residual reshaping where both the Inv( ) and Fwd( ) functions are needed to perform inverse reshaping), one could signal in the bitstream only one of the Inv( ) or Fwd( ) functions, or, alternatively, to reduce decoder complexity, both. Tables 7 and 8 provide two examples for signaling reshaping information.

In Table 7, the reshaping function is communicated as a set of second order polynomials. It is a simplified syntax of the Exploratory Test Model (ETM) (Ref. [5]). An earlier variation can also be found in Ref. [4].

TABLE 7

Example syntax for piece-wise representation of a reshaping function (model_A)

|  | Descriptor |
|---|---|
| reshaping_sliceheader_table_model_A( ) { |  |
|   reshape_input_luma_bit_depth_minus8 | ue(v) |
|   coeff_log2_offset_minus2 | ue(v) |
|   reshape_num_ranges_minus1 | ue(v) |
|   reshape_equal_ranges_flag | u(1) |
|   reshape_global_offset_val | u(v) |
|   if( !reshape_equal_ranges_flag) |  |
|     for ( i = 0; i < reshape_num_ranges_minus1+ 1; i++ ) |  |
|       reshape_range_val[ i ] | u(v) |
|   reshape_continuity_flag | u(1) |
|   for( i = 0; i < reshape_num_ranges_minus1 + 2; i++ ) { |  |
|     reshape_poly_coeff_order0_int[ i ] | ue(v) |
|     reshape_poly_coeff_order0_frac[ i ] | u(v) |
|   } |  |
|   if( reshape_continuity_flag = = 1 ) { |  |
|     reshape_poly_coeff_order1_int | se(v) |
|     reshape_poly_coeff_order1_frac | u(v) |
|   } |  |
| } |  | reshape_input_luma_bit_depth_minus8 specifies the sample bit depth of the input luma component of the reshaping process.

coeff_log 2_offset_minus2 specifies the number of fractional bits for reshaping related coefficients calculations for the luma component. The value of coeff_log 2_offset_minus2 shall be in the range of 0 to 3, inclusive.

reshape_num_ranges_minus1 plus 1 specifies the number of ranges in the piece-wise reshaping function. When not present, the value of reshape_num_ranges_minus1 is inferred to be 0. reshape_num_ranges_minus1 shall be in the range of 0 to 7, inclusive for luma component.

reshape_equal_ranges_flag equal to 1 specifies that piece-wise reshaping function is partitioned into Number-Ranges pieces with nearly equal length and the length of each range is not explicitly signalled. reshape_equal_ranges_flag equal to 0 specifies that the length of each range is explicitly signalled.

reshape_global_offset_val is used to derive the offset value that is used to specify the starting point of 0th range.

reshape_range_val[i] is used to derive the length of the i-th range of the luma component.

reshape_continuity_flag specifies the continuity properties of the reshaping function for the luma component. If reshape_continuity_flag is equal to 0, zeroth order continuity is applied to the piecewise linear inverse reshaping functions between consecutive pivot points. If reshape_continuity_flag is equal to 1, first order smoothness is used to derive the full second order polynomial inverse reshaping functions between consecutive pivot points.

reshape_poly_coeff_order0_int [i] specifies the integer value of the i-th piece 0-th order polynomial coefficient for luma component.

reshape_poly_coeff_order0_frac [i] specifies the fractional value of the i-th piece 0-th order polynomial coefficient for luma component.

reshape_poly_coeff_order1_int specifies the integer value of the 1-st order polynomial coefficient for luma component.

reshape_poly_coeff_order1_frac specifies the fractional value of the 1-st order polynomial coefficient for luma component.

Table 8 describes an example embodiment of an alternative parametric representation according to the model_B discussed earlier (Ref. [3]).

TABLE 8

Example syntax for parametric representation of a reshaping function (model_B)

| | Descriptor |
|---|---|
| reshaping_sliceheader_table_model_B( ) { | |
| reshape_model_profile_type | ue(v) |
| reshape_model_scale_idx | u(2) |
| reshape_model_min_bin_idx | u(5) |
| reshape_model_max_bin_idx | u(5) |
| reshape_model_num_band | u(4) |
| for ( i = 0; i < reshape_model_num_band; i++ ) { | |
| reshape_model_band_profile_delta [ i ] | u(1) |
| } | |
| } | |

Figure 5A:
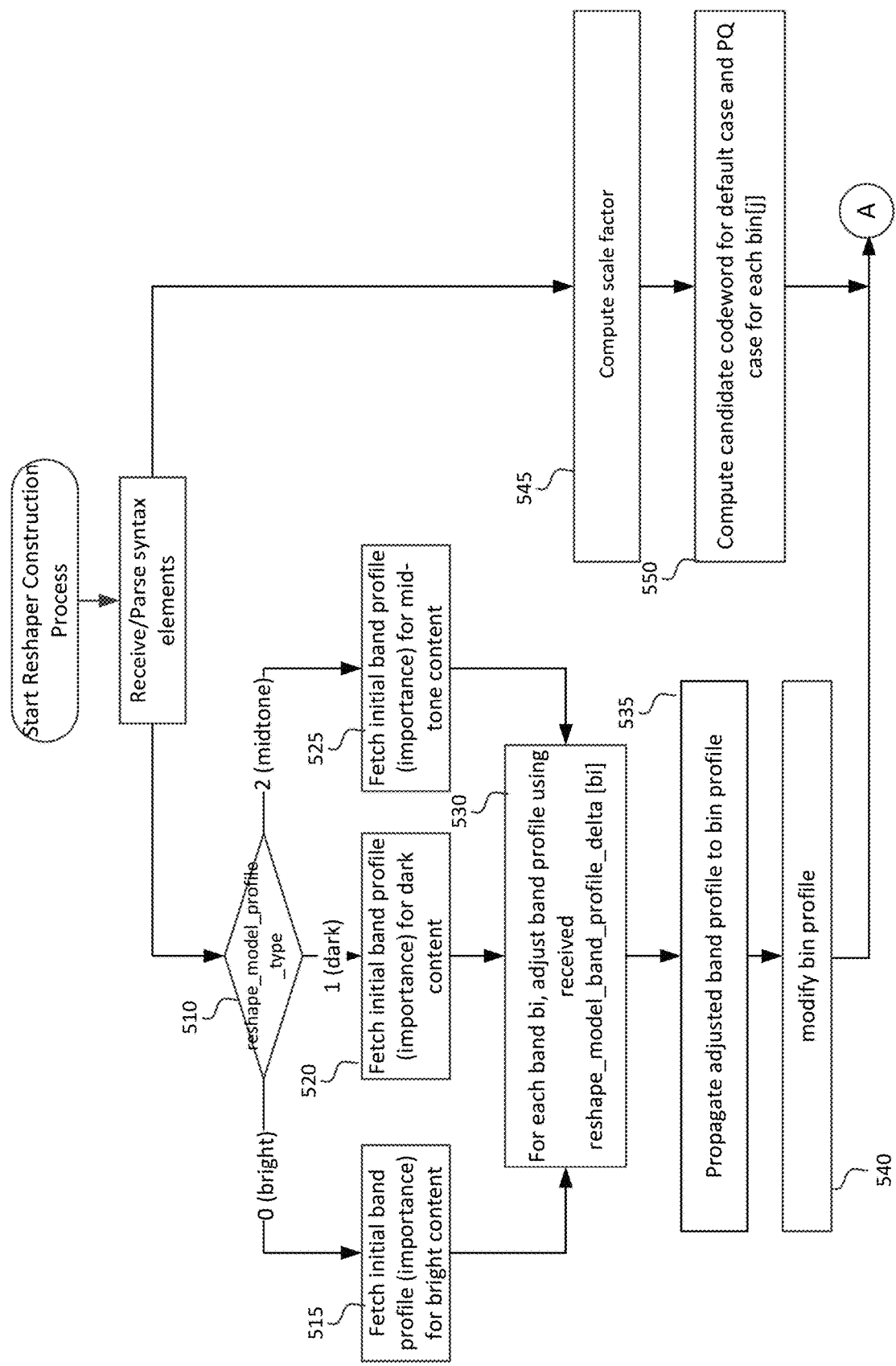
FIG. 5A and FIG. 5B depict a reshaping function reconstruction process in a video decoder according to an embodiment of this invention.
Figure 5B:
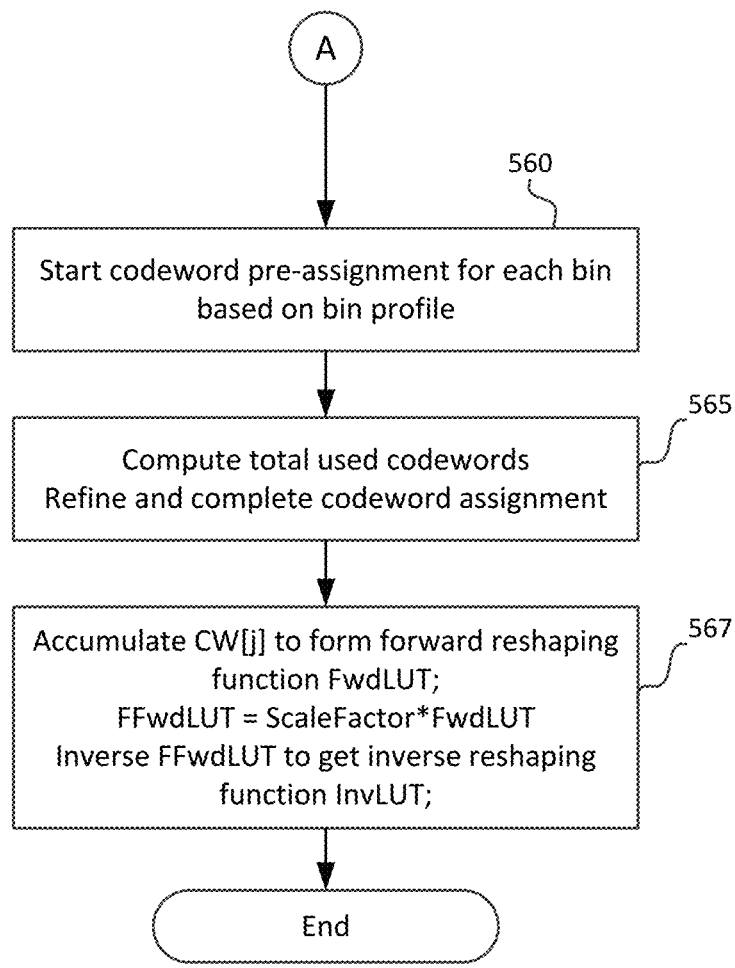

In Table 8, in an embodiment, syntax parameters may be defined as:

reshape_model_profile_type specifies the profile type to be used in the reshaper construction process.

reshape_model_scale_idx specifies the index value of a scale factor (denoted as ScaleFactor) to be used in the reshaper construction process. The value of the ScaleFactor allows for improved control of the reshaping function for improved overall coding efficiency. Additional details on using this ScaleFactor are provided in relation to the discussion on the reshaping function reconstruction process (e.g., as depicted in FIG. 5A and FIG. 5B). As an example, and without limitation, the value of reshape_model_scale_idx shall be in the range of 0 to 3, inclusive. In an embodiment, the mapping relationship between scale_idx and ScaleFactor as shown in the Table below is given by:

$$\text{ScaleFactor} = 1.0 - 0.05 * \text{reshape\_model\_scale\_idx}.$$

| reshape_model_scale_idx | ScaleFactor |
|---|---|
| 0 | 1.0 |
| 1 | 0.95 |
| 2 | 0.9 |
| 3 | 0.85 |

In another embodiment, for a more efficient fixed-point implementation, $$\text{ScaleFactor} = 1 - 1/16 * \text{reshape\_model\_scale\_idx}.$$

| reshape_model_scale_idx | ScaleFactor |
|---|---|
| 0 | 1.0 |
| 1 | 0.9375 |
| 2 | 0.875 |
| 3 | 0.8125 | reshape_model_min_bin_idx specifies the minimum bin index to be used in the reshaper construction process. The value of reshape_model_min_bin_idx shall be in the range of 0 to 31, inclusive.

reshape_model_max_bin_idx specifies the maximum bin index to be used in the reshaper construction process. The value of reshape_model_max_bin_idx shall be in the range of 0 to 31, inclusive.

reshape_model_num_band specifies the number of bands to be used in the reshaper construction process. The value of reshape_model_num_band shall be in the range of 0 to 15, inclusive.

reshape_model_band_profile_delta [i] specifies the delta value to be used to adjust the profile of the i-th band in the reshaper construction process. The value of reshape_model_band_profile_delta [i] shall be in the range of 0 to 1, inclusive.

Compared to Ref. [3], the syntax in Table 8 is far more efficient by defining a set of "default profile types," say, highlights, mid-tones and darks. In an embodiment, each type has a pre-defined visual band importance profile. The pre-defined bands and corresponding profiles can be implemented as fixed values in the decoder or they can also be signaled using a high-level syntax (such as sequence parameter set). At the encoder, each image is first analyzed and categorized into one of the profiled types. The profile type is signaled by syntax element "reshape_model_profile_type." In adaptive reshaping, in order to capture the full range of image dynamics, the default profiling is further adjusted by a delta for each or a subset of the luminance bands. The delta values are derived based on visual importance of the luminance bands, and are signaled by the syntax elements "reshape_model_band_profile_delta."

In one embodiment, the delta value can take only the 0 or 1 values. At the encoder, the visual importance is determined by comparing the percentage of band pixels in the whole image with the percentage of band pixels within "dominant bands," where dominant bands may be detected using a local histogram. If pixels within a band concentrate in a small local block, the band is most likely visual important in the block. The counts for dominant bands are summed up and normalized to form a meaningful comparison to get the delta values for each band.

In a decoder, a reshaper function reconstruction process has to be invoked to derive the reshaping LUTs based on methods described in Ref. [3]. Therefore, complexity is higher compared to the simpler piece-wise approximation model, which only needs to evaluate the piece-wise polynomial functions to compute the LUT. The benefit of using a parametric-model syntax is that it can significantly reduce the bitrate of using a reshaper. For example, based on typical testing content, the model depicted in Table 7 needs 200-300 bits to signal a reshaper, while a parametric model (as in Table 8) only uses about 40 bits.

In another embodiment, as depicted in Table 9, the forward reshaping look-up table may be derived according to a parametric model for the dQP values. For example, in an embodiment, $$dQP = \text{clip3}(\min, \max, \text{scale} * X + \text{offset}),$$

wherein min and max denote the boundaries of dQP, scale and offset are two parameters of the model, and X denotes a parameter derived based on signal luminance (e.g., a pixel's luminance value, or for blocks, a metric of block luminance, e.g., its minimum, maximum, average, variance, standard deviation, and the like). For example, without limitation, $$dQP = \text{clip3}(-3, 6, 0.015 * X - 7.5).$$

TABLE 9

Example syntax for parametric representation of a reshaping function (model C)

|  | descriptor |
|---|---|
| sps_reshaper_model_C( ) { |  |
|   full_range_input_flag | u(1) |
|   dQP_model_scale_int_prec | ue(v) |
|   if (dQP_model_scale_int_prec > 0) { |  |
|     dQP_model_scale_int | u(v) |
|   } |  |
|   dQP_model_scale_frac_prec_minus16 | ue(v) |
|   dQP_model_scale_frac | u(v) |
|   if (dQPModelScaleAbs) { |  |
|     dQP_model_scale_sign | u(1) |
|   } |  |
|   dQP_model_offset_int_prec_minus3 | ue(v) |
|   dQP_model_offset_int | u(v) |
|   dQP_model_offset_frac_prec_minus1 | ue(v) |
|   dQP_model_offset_frac | u(v) |
|   if (dQPModelOffsetAbs) { |  |
|     dQP_model_offset_sign | u(1) |
|   } |  |
|   dQP_model_abs_prec_minus3 | ue(v) |
|   dQP_model_max_abs | u(v) |
|   if (dQP_model_max_abs) { |  |
|     dQP_model_max_sign | u(1) |
|   } |  |
|   dQP_model_min_abs | u(v) |
|   if (dQP_model_min_abs) { |  |
|     dQP_model_min_sign | u(1) |
|   } |  |
| } |  |

In an embodiment, parameters in Table 9 may be defined as follows: full_range_input_flag specifies the input video signal range. A full_range_input_flag of 0 corresponds to a standard dynamic range input video signal. A full_range_input_flag of 1 corresponds to full range input video signal. When not present, full_range_input_flag is inferred to be 0.

Note: As used herein, the term "full-range video" denotes that the valid codewords in the video are not "limited." For example, for 10-bit full range video, the valid codewords are between 0 and 1023, where 0 is mapped to the lowest luminance level. In contrast, for 10-bit "standard range video," the valid codewords are between 64 and 940, and 64 is mapped to the lowest luminance level.

For example, the calculation of "full range" and "standard range" may be computed as follows:

for normalized luminance values Ey' in [0 1], to code in BD bits (e.g., BD=10, 12, and the like):

full range: $Y = \text{clip3}(0, (1 << BD) - 1, Ey' * ((1 << BD) - 1))$ standard range: $Y = $ $\text{clip3}(0, (1 << BD) - 1, \text{round}(1 << (BD - 8) * (219 * Ey' + 16)))$ This syntax is similar to the "video_full_range_flag" syntax in HEVC VUI parameters as described in Section E.2.1 of the HEVC (H.265) Specification (Ref. [11]).

dQP_model_scale_int_prec specifies the number of bits used for the representation of dQP_model_scale_int. A dQP_model_scale_int_prec equals to 0 indicates dQP_model_scale_int is not signaled and is inferred to be 0.

dQP_model_scale_int specifies the integer value of dQP model scale.

dQP_model_scale_frac_prec_minus16 plus 16 specifies the number of bits used for the representation of dQP_model_scale_frac.

dQP_model_scale_frac specifies the fractional value of the dQP model scale.

The variable dQPModelScaleAbs is derived as:

dQPModelScaleAbs=dQP_model_scale_int<<
  (dQP_model_scale_frac_prec_minus16+16)+
  dQP_model_scale_frac dQP_model_scale_sign specify the sign of dQP model scale. When dQPModelScaleAbs equals 0, dQP_model_scale_sign is not signaled and it is inferred to be 0.

dQP_model_offset_int_prec_minus3 plus 3 specifies the number of bits used for the reprentation of dQP_model_offset_int.

dQP_model_offset_int specifies the integer value of dQP model offset.

dQP_model_offset_frac_prec_minus1 plus 1 specifies the number of bits used for the representation of dQP_model_offset_frac.

dQP_model_offset_frac specifies the fractional value of the dQP model offset.

The variable dQPModelOffsetAbs is derived as:

dQPModelOffsetAbs=dQP_model_offset_int<<
  (dQP_model_offset_frac_prec_minus1+1)+
  dQP_model_offset_frac dQP_model_offset_sign specifies the sign of dQP model offset. When dQPModelOffsetAbs equals 0, dQP_model_offset_sign is not signaled and is inferred to be 0.

dQP_model_abs_prec_minus3 plus 3 specifies the number of bits used for the representation of dQP_model_max_abs and dQP_model_min_abs.

dQP_model_max_abs specifies the integer value of dQP model max.

dQP_model_max_sign specifies the sign of dQP model max. When dQP_model_max_abs equals 0, dQP_model_max_sign is not signaled and is inferred to be 0.

dQP_model_min_abs specifies the integer value of dQP model min.

dQP_model_min_sign specifies the sign of dQP model min. When dQP_model_min_abs equals 0, dQP_model_min_sign is not signaled and is inferred to be 0.

Decoding Process for Model C

Given the syntax elements of Table 9, the reshaping LUT may be derived as follows.

The variable dQPModelScaleFP is derived as:
dQPModelScaleFP = ((1− 2*dQP_model_scale_sign) * dQPModelScaleAbs ) << (dQP_model_offset_frac_prec_minus1 + 1).
The variable dQPModelOffsetFP is derived as:
dQPModelOffsetFP = ((1−2* dQP_model_offset_sign) * dQPModelOffsetAbs ) << (dQP_model_scale_frac_prec_minus16 + 16).
The variable dQPModelShift is derived as:
dQPModelShift = (dQP_model_offset_frac_prec_minus1 + 1) + (dQP_model_scale_frac_prec_minus16 + 16).
The variable dQPModelMaxFP is derived as:
dQPModelMaxFP = ((1− 2*dQP_model_max_sign) * dQP_model_max_abs) << dQPModelShift.

The variable dQPModelMinFP is derived as:

```
dQPModelMinFP = ((1− 2*dQP_model_min_sign) * dQP_model_min_abs) << dQPModelShift.
for Y =0: maxY    // For example, for 10-bit video, maxY=1023
{
      dQP[Y] = clip3( dQPModelMinFP, dQPModelMaxFP, dQPModelScaleFP*Y + dQPModelOffsetFP);
      slope[Y] = exp2((dQP[Y]+3)/6);         // fixed point exp2 implementation where
      exp2(x) = 2^(x);
}
If ( full_range_input_flag == 0 )           // if input is standard range video
    For Y out of standard range (i.e. Y = [0:63] and [940:1023]), set slope[Y] = 0;
  CDF[0] = slope[0];
for Y =0: maxY−1
{
      CDF[Y+1] = CDF[Y] + slope[Y]; // CDF[Y] is the integral of slope[Y]
}
for Y=0: maxY
{
      FwdLUT[Y] = round(CDF[Y]*maxY/CDF[maxY]); // rounding and normalization to
get FwdLUT
}
```

Figure 7:
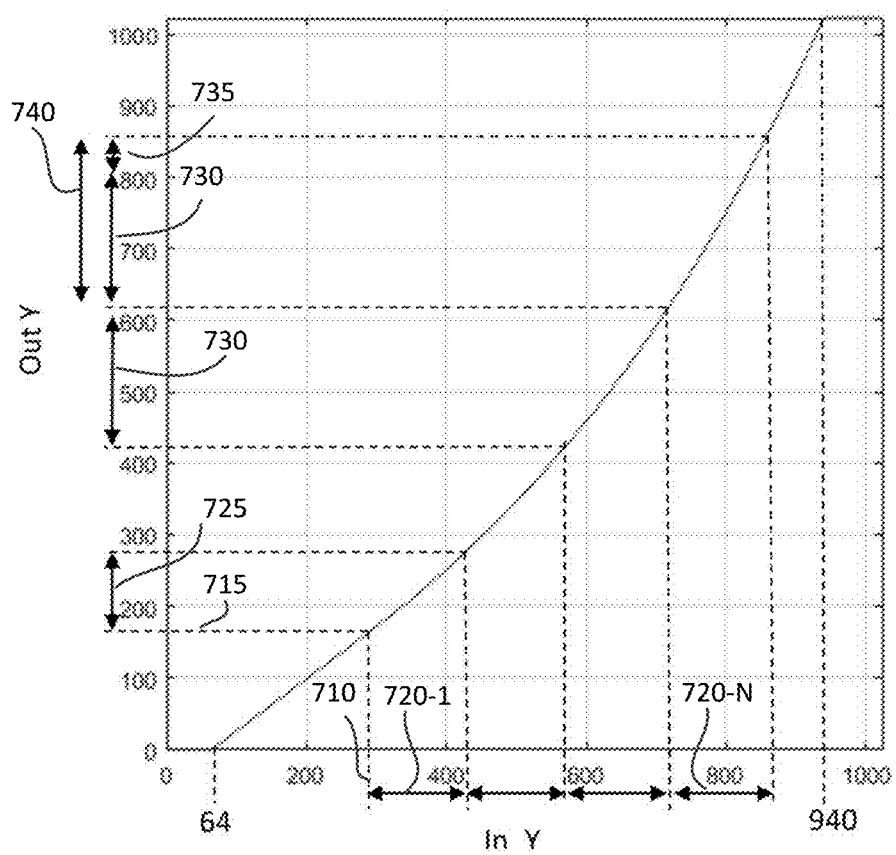
FIG. 7 depicts an example of a pivot-based representation of a reshaping function according to an embodiment of this invention.

In another embodiment, as depicted in Table 10, the forward reshaping function may be represented as a collection of luma pivot points (In_Y) and their corresponding codewords (Out_Y). To simplify coding, the input luminance range is described in terms of a starting pivot and a sequence of equally-spaced subsequent pivots using a linear piece-wise representation. An example of representing a forward reshaping function for 10-bit input data is depicted in FIG. 7.

TABLE 10

Example syntax for pivot-based representation
of a reshaping function (model D)

|  | descriptor |
|---|---|
| sps_reshaper_model_D( ) { |  |
|   full_range_input_flag | u(1) |
|   bin_pivot_start | u(v) |
|   bin_cw_start | u(v) |
|   log2_num_equal_bins_minus3 | ue(v) |
|   equal_bin_pivot_delta | u(v) |
|   bin_cw_in_first_equal_bin | u(v) |
|   bin_cw_delta_abs_prec_minus4 | ue(v) |
|   for( i = 0 ; i < NumEqualBins − 1 ; i++ ) { |  |
|     bin_cw_delta_abs[ i ] | u(v) |
|     if ( bin_cw_delta_abs[ i ] ) { |  |
|       bin_cw_delta_sign[ i ] | u(1) |
|     } |  |
|   } |  |
| } |  |

In an embodiment, parameters in Table 10 may be defined as follows:

full_range_input_flag specifies the input video signal range. A full_range_input_flag of 0 corresponds to standard range input video signal. A full_range_input_flag of 1 corresponds to full range input video signal. When not present, full_range_input_flag is inferred to be 0.

bin_pivot_start specifies the pivot value of the first equal-length bin (710). When full_range_input_flag equals to 0, bin_pivot_start shall be larger than or equal to the smallest standard range input, and shall be smaller than the largest standard range input. (For example, for 10-bit SDR input, bin_pivot_start (710) shall be between 64 and 940).

bin_cw_start specifies the mapped value (715) of bin_pivot_start (710) (e.g., bin_cw_start=FwdLUT [bin_pivot_start]).

log2_num_equal_bins_minus3 plus 3 specifies the number of equal-length bins subsequent to the starting pivot (710). The variable NumEqualBins and NumTotalBins are defined by:

```
NumEqualBins = 1<<(log2_num_equal_bins_minus3+3)
if full_range_input_flag == 0
    NumTotalBins = NumEqualBins + 4
else
    NumTotalBins = NumEqualBins + 2
```

Note: Experimental results show that most forward reshaping functions may be represented using eight equal-length segments; however, complex reshaping functions may require more segments (e.g., 16 or more).

equal_bin_pivot_delta specifies the length of the equal-length bins (e.g., 720-1, 720-N). NumEqualBins*equal_bin_pivot_delta shall be less than or equal to valid input range. (For example, if full_range_input_flag is 0, valid input range should be 940−64=876 for 10-bit inputs; if full_range_input_flag is 1, valid input range should be from 0 to 1023 for 10-bit inputs.)

bin_cw_in_first_equal_bin specifies the number of mapped codewords (725) in the first equal-length bin (720-1).

bin_cw_delta_abs_prec_minus4 plus 4 specifies the number of bits used for the reprentation of bin_cw_delta_abs[i] for each subsequent equal bin.

bin_cw_delta_abs[i] specifies the value of bin_cw_delta_abs[i] for each subsequent equal-length bin. bin_cw_delta[i] (e.g., 735) is the difference of codewords (e.g., 740) in current equal-length bin i (e.g., 720-N) compared with the codewords (e.g., 730) in the previous equal-length bin i−1.

bin_cw_delta_sign[i] specifies the sign of bin_cw_delta_abs[i]. When bin_cw_delta_abs[i] equals 0, bin_cw_delta_sign[i] is not signaled and is inferred to be 0. The variable bin_cw_delta[i]=(1−2*bin_cw_delta_sign[i])*bin_cw_delta_abs[i]

Decoding Process for Model D

Given the syntax elements of Table 10, the reshaping LUT may be derived as follows for a 10-bit input:

Define constants:

```
minIN = minOUT = 0;
maxIN = maxOUT = 2^BD − 1 = 1023 for 10-bit    //BD = Bit depth
minStdIN = 64 for 10-bit
maxStdIN = 940 for 10-bit
Step 1: derive pivot value In_Y [ j ] for j = 0: NumTotalBins
  In_Y [ 0 ] = 0;
  In_Y [ NumTotalBins ] = maxIN;
  if ( full_range_input_flag == 0 )
  {
    In_Y [ 1 ] = minStdIN;
    In_Y [ 2 ] = bin_pivot_start;
    for ( j = 3: NumTotalBins −2 )
      In_Y [ j ] = In_Y [ j − 1 ] + equal_bin_pivot_delta;
    In_Y [ NumTotalBins − 1 ] = maxStdIN;
  }
  else
  {
    In_Y [ 1 ] = bin_pivot_start;
    for j = 2: NumTotalBins − 1
      In_Y [ j ] = In_Y [ j − 1 ] + equal_bin_pivot_delta;
  }
Step 2: derive mapped value Out_Y [ j ] for j = 0: NumTotalBins
  Out_Y [ 0 ] = 0;
  Out_Y [ NumTotalBins ] = maxOUT;
  if ( full_range_input_flag == 0 )
  {
    Out_Y [ 1 ] = 0;
    Out_Y [ 2 ] = bin_cw_start;
    Out_Y [ 3 ] = bin_cw_start + bin_cw_in_first_equal_bin;
    bin_cw [ 3 ] = bin_cw_in_first_equal_bin;
    for j = ( 4 : NumTotalBins − 2 )
      bin_cw [ j ] = bin_cw [ j − 1 ] + bin_cw_delta [ j − 4 ];   // bin_cw_delta[ i ] start from idx 0
    for j = ( 4 : NumTotalBins − 2 )
      Out_Y [ j ] = Out_Y [ j − 1 ] + bin_cw [ j ];
    Out_Y [ NumTotalBins − 1 ] = maxOUT;
  }
  else
  {
    Out_Y [ 1 ] = bin_cw_start;
    Out_Y [ 2 ] = bin_cw_start + bin_cw_in_first_equal_bin;
    bin_cw [ 2 ] = bin_cw_in_first_equal_bin;
    for j = ( 3 : NumTotalBins − 1 )
      bin_cw [ j ] = bin_cw [ j − 1 ] + bin_cw_delta [ j − 3 ];   // bin_cw_delta[ i ] start from idx 0
    for j = 3: NumTotalBins − 1
      Out_Y [ j ] = Out_Y [ j − 1 ] + bin_cw [ j ];
  }
Step 3: Linear interpolation to get all LUT entry
  Init: FwdLUT[ ]
  for ( j = 0: NumTotalBins − 1 )
  {
    InS  = In_Y [ j ];
    InE  = In_Y [ j + 1 ];
    OutS = Out_Y [ j ];
    OutE = Out_Y [ j + 1 ];
    for i = In_Y[ j ] : In_Y[ j + 1] − 1
    {
      FwdLUT [ i ] = OutS + round ( ( OutE − OutS ) * ( i − InS) / (InE − InS) );
    }
  }
  FwdLUT [ In_Y [ NumTotalBins ] ] = Out_Y [ NumTotalBins ];
```

In general, reshaping can be switched on or off for each slice. For example, one may only enable reshaping for intra slices and disable reshaping for inter slices. In another example, one may disable reshaping for inter-slices which have the highest temporal level. (Note: as an example, as used herein, temporal sub-layers may match the definition of temporal sub-layers in HEVC.) In defining the reshaper model, in one example, one may only signal the reshaper model in SPS, but in another example, one may signal the slice reshaper model in intra slices. Alternatively, one may signal the reshaper model in SPS and allow the slice reshaper model to update the SPS reshaper model for all slices, or one may only allow the slice reshaper model to update the SPS reshaper model for intra slices. For inter slices which follow an intra slice, one may apply either the SPS reshaper model or an intra slice reshaper model.

As another example, FIGS. 5A and 5B depict a reshaping function reconstruction process in a decoder according to an embodiment. The process uses the methods described herein and in Ref. [3] with a visual rating range in [0 5].

As depicted in FIG. 5A, first (step 510), the decoder extracts the reshape_model_profile_type variable and sets (steps 515, 520, and 525) for each bin the appropriate initial band profile. For example, in pseudocode:

```
if (reshape_model_profile_type == 0) R[b_i] = R_bright[b_i];
elseif (reshape_model_profile_type == 1) R[b_i] = R_dark[b_i];
else R[b_i] = R_mid[b_i].
```

In step 530, the decoder adjusts each band profile using the received reshape_model_band_profile_delta[bi] values, as in

```
for (i = 0: reshape_model_num_band-1)
 {R[b_i] = R[b_i] + reshape_model_band_profile_delta [b_i]}.
```

In step 535, the decoder propagates the adjusted values to each bin profile, as in

```
if bin[j] belongs to band b_i , R_bin[j] = R[b_i].
```

In step 540, the bin profiles are modified, as in

```
if (j > reshape_model_max_bin_idx) or (j <
    reshape_model_min_bin_idx) {R_bin[j] = 0 }.
```

In parallel, in steps 545 and 550, the decoder can extract the parameters to compute the scale factor value and candidate codewords for each bin[j], as in

```
ScaleFactor = 1.0 − 0.05* reshape_model_scale_idx
CW_dft[j] = codewords in the bin if using default reshaping
CW_PQ[j]=TotalCW/TotalNumBins.
```

In computing the ScaleFactor value, for a fixed-point implementation, instead of using the scaler 0.05 one may use $1/16=0.0625$ instead.

Continuing to FIG. 5B, in step 560, the decoder starts a codeword (CW) pre-assignment for each bin based on the bin profile, as in

```
If R_bin[j] == 0, CW[j] = 0
If R_bin[j] == 1, CW[j] = CW_dft[j]/2;
If R_bin[j] == 2, CW[j] = min(CW_PQ[j], CW_dft[j]);
If R_bin[j] == 3, CW[j] = (CW_PQ[j] + CW_dft[j])/2;
If R_bin[j] >=4, CW[j] = max(CW_PQ[j], CW_dft[j]).
```

In step 565, it computes the total used codewords and refines/completes the codeword (CW) assignments, as in

```
CW_used = Sum(CW[j]):
if CW_used > TotalCW, rebalance CW[j] = CW[j]/(CW_used/TotalCW);
else
{
    CW_remain = TotalCW − CW_used ;
    CW_remain is assigned to the bins with largest R_bin[j]);
}
```

Finally, in step 567, the decoder a) generates the forward reshaping function (e.g., FwdLUT) by accumulating the CW[j] values, b) multiplies the ScaleFactor value with the FwdLUT values to form the final FwdLUT (FFwdLUT), and c) it generates the inverse reshaping function InvLUT based on the FFwdLUT.

In a fixed-point implementation, computing the ScaleFactor and FFwdLUT may be expressed as:

```
ScaleFactor = (1<< SF_PREC) − reshape_model_scale_idx
FFwdLUT = (FwdLUT * ScaleFactor + (1 << (FP_PREC + SF_PREC −
    1))) >> (FP_PREC + SF_PREC),
``` where SF_PREC and FP_PREC are predefined precision-related variables (e.g., SF_PREC=4, and FP_PREC=14), "c=a<<n" denotes a binary left shift operation of a by n bits (or $c=a*(2^n)$), and "c=a>>n" denotes a binary right shift operation of a by n bits (or $c=a/(2^n)$).

Chroma QP Derivations

Chroma-coding performance is closely related to the luma-coding performance. For example, in AVC and HEVC, a table is defined to specify the relationship between the quantization parameters (QP) for luma and chroma components, or between luminance and chrominance. The specifications also allow to use one or more chroma QP offsets for additional flexibility in defining the QP relationship between luma and chroma. When reshaping is used, the luma value is modified, hence, the relationship between luminance and chrominance might be modified as well. To maintain and further improve the coding efficiency under reshaping, in an embodiment, at the coding unit (CU) level, a chroma QP offset is derived based on the reshaping curve. This operation needs to be performed at both the decoder and the encoder.

As used herein, the term "coding unit" (CU) denotes a coded block (e.g., a macroblock and the like). For example, without limitation, in HEVC, a CU is defined as "a coding block of luma samples, two corresponding coding blocks of chroma samples of a picture that has three sample arrays, or a coding block of samples of a monochrome picture or a picture that is coded using three separate color planes and syntax structures used to code the samples."

In an embodiment, the chroma quantization parameter (QP) (chromaQP) value may be derived as follows:

1) Based on the reshaping curve, derive the equivalent luma dQP mapping, dQPLUT:

```
for CW = 0: MAX_CW_VALUE−1
    dQPLUT [CW]= −6*log2( slope[CW] );
``` where slope[CW] denotes the slope of the forward reshaping curve at each CW (codeword) point, and MAX_CW_VALUE is the maximum codeword value for a given bit-depth, for example, for a 10-bit signal, MAX_CW_VALUE=1024 ($2^{10}$)

Then, for each coding unit (CU):

2) compute the coding unit's average luminance, denoted as AvgY:
3) compute the chromaDQP value based on dQPLUT[ ], AvgY, the reshaping architecture, the inverse reshaping function Inv( ), and the slice type, as shown on the Table 11 below:

TABLE 11

Example chromaDQP values according to reshaping architectures

| Reshaping Architecture | Intra slice | Inter slice |
|---|---|---|
| Out-of-loop | dQPLUT[Inv(AvgY)] | dQPLUT[Inv(AvgY)] |
| In-loop intra only reshaper | dQPLUT[Inv(AvgY)] | 0 |
| In-loop reshaper for residuals | dQPLUT[AvgY] | dQPLUT[AvgY] |
| Hybrid in-loop reshaping | dQPLUT[Inv(AvgY)] | dQPLUT[AvgY] |

4) compute chromaQP as:

$$chromaQP = QP\_luma + chromaQPOffset + chromaDQP;$$

where chromaQPOffset denotes a chroma QP offset, and QP_luma denotes the luma QP for the coding unit. Note that the value of the chroma QP offset may be different for each chroma component (say, Cb and Cr) and chroma QP offset values are communicated to the decoder as part of the coded bitstream.

In an embodiment, dQPLUT[ ] can be implemented as a pre-defined LUT. Assume one divides all codewords into N bins (e.g, N=32) and each bin contains M=MAX_CW_VALUE/N codewords (e.g, M=1024/32=32). When one assigns a new codewords to each bin, they can limit the number of codewords to be 1 to 2*M, so they can precompute dQPLUT[1 . . . 2*M] and save it as a LUT. This approach can avoid any floating-point computations or the approximation of fix point computations. It can also save encoding/decoding time. For each bin, one fixed chromaQPOffset is used for all codewords in this bin. The DQP value is set to equal to dQPLUT[L] where L is the number of codewords for this bin, where 1≤L≤2*M.

The dQPLUT values may be precomputed as follows:

```
for i=1:2*M
    slope[i] = i/M;
``` dQPLUT[i] = −6*log2(slope[i]);
end

Different quantization schemes can be used to get an integer QP value when computing dQPLUT[x], such as: round( ), ceil( ), floor(or a mix of them. For example, one can set a threshold TH, and if Y<TH, use floor(to quantize dQP value, else, when Y≥TH, use ceil(to quantize dQP value. The usage of such quantization schemes and the corresponding parameters can be pre-defined in a codec or can be signaled in the bitstream for adaptation. An example syntax which allows mixing of quantization schemes with one threshold as discussed earlier is shown as follows:

|  | Descriptor |
|---|---|
| quant_scheme_signal_table( ) { | |
|   if (sps_reshaper_chromaAdj > 0) { | |
|     quant_scheme_idc  // 0: round( ), 1: ceil( ), 2: floor( ), 3: mix | u(2) |
|     if (quant_scheme_idc == 3) { //mix | |
|       quant_change_threshold | u(v) |
|       first_quant_scheme_idc | u(2) |
|       second_quant_scheme_idc | u(2) |
|     } | |
|   } | |
| } | |

The quant_scheme_signal_table( ) function can be defined at different levels of the reshaping syntax (e.g. the sequence level, the slice level, and the like), depending on the adaptation need.

In another embodiment, chromaDQP values may be computed by applying a scaling factor to the residue signal in each coding unit (or transform unit, to be more specific). This scaling factor may be a luma-dependent value and can be computed: a) numerically, e.g., as the first order derivative (slope) of the forward reshaping LUT (see for example equation (6) in the next Section), or b) as:

$$Slope(x) = 2^{\left(\frac{dQP(x)}{6}\right)}.$$

When computing Slope(x) using dQP (x), dQP can be kept in floating point precision without integer quantization. Alternatively, one may compute quantized integer dQP values using a variety of different quantization schemes. In some embodiments, such scaling can be performed at the pixel level instead of at the block level, where each chroma residue can be scaled by a different scale factor, derived using the co-located luma prediction value of that chroma sample. Thus,

TABLE 12

Example chroma dQP values using scaling for hybrid in loop reshaping architecture

| Update | Intra slice | Inter slice |
|---|---|---|
| CU-based chroma scaling (same S_cu scaler shared by all samples in CU) | Scu=SlopeLUT[Inv(AvgY)]<br>C_Res_scaled = C_Res * S_cu | Scu=SlopeLUT[AvgY]<br>C_Res_scaled = C_Res * S_cu |

TABLE 12-continued

Example chroma dQP values using scaling
for hybrid in loop reshaping architecture

| Update | Intra slice | Inter slice |
|---|---|---|
| Pixel-based chroma scaling (different S_px scaler in each sample) | Spx=SlopeLUT[Inv(ColPredY)]<br>C_Res_scaled =C_Res* S_px | Spx=SlopeLUT[ColPredY]<br>C_Res_scaled = C_Res * S_px |

For example, if CSCALE_FP_PREC=16
Forward scaling: after chroma residual is generated, before transformation and quantization:

$C\_Res=C\_orig-C\_pred$ $C\_Res\_scaled=C\_Res*S+(1<<(CSCALE\_FP\_PREC-1)))>>CSCALE\_FP\_PREC$ Inverse scaling: after chroma inverse quantization and inverse transformation, but before reconstruction:

$C\_Res\_inv=(C\_Res\_scaled<<CSCALE\_FP\_PREC)/S$ $C\_Reco=C\_Pred+C\_Res\_inv;$ where S is either S_cu or S_px.

Note: In Table 12, in computing Scu, the average luma of a block (AvgY) is calculated before applying inverse reshaping. Alternatively, one may apply inverse reshaping before computing the average luma, e.g., Scu=SlopeLUT[Avg(Inv[Y])]. This alternative order of computations applies to computing values in Table 11 as well; that is, computing Inv(AvgY) could be replaced by computing Avg(Inv[Y]) values. The latter approach may be considered more accurate, but has increased computational complexity.

Encoder Optimizations with Respect to Reshaping

This section discusses a number of techniques to improve coding efficiency in the encoder by jointly optimizing the reshaping and encoder parameters when reshaping is a part of a normative decoding process (as described in one of the three candidate architectures). In general, encoder optimization and reshaping are tackling the coding problem at different places with their own limitations. In a traditional imaging and coding system there are two types of quantization: a) sample quantization (e.g., gamma or PQ coding) in the baseband signal and b) transform-related quantization (part of compression). Reshaping is located in-between. Picture-based reshaping is in general updated on a picture basis and only allows sample value mappings based on its luminance level, without consideration of any spatial information. In a block-based codec (such as, HEVC), transform quantization (e.g., for luma) is applied within a spatial block and can be adjusted spatially, therefore encoder optimization methods have to apply the same set of parameters for a whole block containing samples with different luminance values. As appreciated by the inventors and described herein, joint reshaping and encoder optimization can further improve coding efficiency.

Inter/Intra Mode Decision

In traditional coding, inter/intra-mode decisions are based on computing a distortion function (dfunc( )) between the original samples and the predicted samples. Examples of such functions include the sum of square errors (SSE), the sum of absolute differences (SAD), and others. In an embodiment, such distortion metrics may be used using reshaped pixel values. For example, if the original dfunct( ) uses Orig_sample(i) and Pred_sample(i), when reshaping is applied, dfunct( ) may use their corresponding reshaped values, Fwd(Orig_sample(i)) and Fwd(Pred_sample(i)). This approach allows for a more accurate inter/intra mode decision, thus improving coding efficiency.

LumaDQP with Reshaping

In the JCTVC HDR common test conditions (CTC) document (Ref. [6]), lumaDQP and chromaQPoffsets are two encoder settings used to modify quantization (QP) parameters for luma and chroma components to improve HDR coding efficiency. In this invention, several new encoder algorithms are proposed to further improve the original proposal. For each lumaDQP adaptation unit (for example, a 64×64 CTU), a dQP value is computed based on the unit's average input luma value (as in Table 3 of Ref. [6]). The final quantization parameter QP used for each Coding Units within this lumaDQP adaptation unit should be adjusted by subtracting this dQP. The dQP mapping table is configurable in the encoder input configuration. This input configuration is denoted as $dQP_{inp}$.

As discussed in Ref. [6] and [7], in existing coding schemes, the same lumaDQP LUT $dQP_{inp}$ is used for both intra and inter pictures. Intra-picture and inter-picture may have different properties and quality characteristics. In this invention, it is proposed to adapt the lumaDQP settings based on picture coding type. Therefore, two dQP mapping tables are configurable in the encoder input configuration, and are denoted as $dQP_{inpIntra}$ and $dQP_{inpInter}$.

As discussed earlier, when using the in-loop Intra reshaping method, because reshaping is not performed on inter pictures, it is important that some lumaDQP setting is applied to inter-coded pictures to achieve similar quality as if the inter pictures are reshaped by the same reshaper used for intra picture. In one embodiment, the lumaDQP setting for inter-pictures should match the characteristics of the reshaping curve used in intra pictures. Let $$Slope(x) = Fwd'(x) = (Fwd(x+dx) - Fwd(x-dx))/(2dx), \quad (6)$$

denote the first derivative of the forward reshaping function, then, in an embodiment, denote the automatically derived $dQP_{auto}(x)$ values may be computed as follows:
If Slope(x)=0, then $dQP_{auto}(x)=0$, otherwise $$dQP_{auto}(x) = 6\log2(Slope(x)), \quad (7)$$

where $dQP_{auto}(x)$ may be clipped in a reasonable range, for example, [−6 6].

If lumaDQP is enabled for intra pictures with reshaping (i.e, external $dQP_{inpIntra}$ is set), lumaDQP for inter-pictures should take that into considerations. In an embodiment, the final inter dQP$_{final}$ may be computed by adding the dQP$_{auto}$ derived from the reshaper (equation (7)) and the dQP$_{inpIntra}$ setting for intra pictures. In another embodiment, to take advantage of intra quality propagation, the dQP$_{final}$ for inter-pictures can be set either to dQP$_{auto}$ or just at a small increment (by setting dQP$_{inpInter}$) and added to dQP$_{auto}$.

In an embodiment, when reshaping is enabled, the following general rules for setting luma dQP values may apply:
(1) Luma dQP mapping tables can be set independently for intra and inter pictures (based on picture coding type);
(2) If a picture inside the coding loop is in the reshaped domain (e.g., intra pictures in in-loop Intra reshaping architecture or all pictures in out-of-loop reshaping architecture), the input luma to delta QP mapping, dQP$_{inp}$, needs to be translated to reshaped domain dQP$_{rsp}$ as well. That is $$dQP_{rsp}(x) = dQP_{inp}[Inv(x)]. \quad (8)$$

(3) If a picture inside the coding loop is in non-reshaped domain (e.g., inverse-reshaped or not reshaped, for example, inter pictures in in-loop Intra reshaping architecture or all pictures in in-loop residual reshaping architecture), the input luma to delta QP mapping does not need to be translated and can be used directly.
(4) Automatic inter deltaQP derivation is only valid for in-loop Intra reshaping architecture. The actual delta QP used for inter pictures in such case is the summed values of auto-derived and input:

$$dQP_{final}[x] = dQP_{inp}[x] + dQP_{auto}[x], \quad (9)$$

and dQP$_{final}$[x] can be clipped to a reasonable range, for example [−12 12];
(5) The luma to dQP mapping table can be updated in every picture or when there is a change of reshaping LUT. Actual dQP adaptation (from a block's average luma value, get the corresponding dQP for quantization of this block) can happen at CU level (encoder configurable).

Table 13 summarizes the dQP settings for each one of the three proposed architectures.

TABLE 13 dQP setting

| | architecture | | |
|---|---|---|---|
| | Out-of-Loop | In-Loop Intra only | In-Loop Residual |
| Intra Picture dQP | dQP$_{final}$(x) = dQP$_{rsp}$(x) = dQP$_{inpIntra}$[Inv(x)] | dQP$_{final}$(x) = dQP$_{rsp}$(x) = dQP$_{inpIntra}$[Inv(x)] | dQP$_{final}$(x) = dQP$_{inpIntra}$(x) |
| Inter Picture dQP | dQP$_{final}$(x) = dQP$_{rsp}$(x) = dQP$_{inpInter}$[Inv(x)] | dQP$_{final}$(x) = dQP$_{auto}$(x) + dQP$_{inpInter}$(x) | dQP$_{final}$(x) = dQP$_{inpInter}$(x) |

Rate Distortion Optimization (RDO)

In the JEM6.0 software (Ref. [8]), RDO (Rate Distortion Optimization) pixel-based weighted distortion is used when lumaDQP is enabled. The weight table is fixed based on luminance values. In an embodiment, the weight table should be adaptively adjusted based on the lumaDQP setting, computed as proposed in the previous section. Two weights, for sum of square error (SSE) and sum of absolute differences (SAD) are proposed as follows:

$$\text{weight\_SSE}[x] = 2^{\left(\frac{dQP[x]}{3}\right)}, \quad (10a)$$

$$\text{weight\_SAD}[x] = 2^{\left(\frac{dQP[x]}{6}\right)}. \quad (10b)$$

The weight computed by equation (10a) or equation (10b) is the total weight based on the final dQP, which comprises both input lumaDQP and derived dQP from the forward reshaping function. For example, based on equation (9), equation (10a) can be written as $$\text{weight}_{SSE}[x] = 2^{\left(\frac{dQP_{final}[x]}{3}\right)} = 2^{\left(\frac{dQP_{inp}[x]+dQP_{auto}[x]}{3}\right)} = 2^{\left(\frac{dQP_{inp}[x]}{3}\right)} * 2^{\left(\frac{dQP_{auto}[x]}{3}\right)}.$$

The total weight can be separated by weight computed by input lumaDQP:

$$\text{weight}_{SSE}[x]\_inp = 2^{\left(\frac{dQP_{inp}[x]}{3}\right)},$$

and weight from reshaping:

$$\text{weight}_{SSE}[x]_{reshape} = 2^{\left(\frac{dQP_{auto}[x]}{3}\right)} = 2^{\left(\frac{6\log2(Slope(x))}{3}\right)} = (\text{Slope }(x))^2.$$

When the total weight is computed using total dQP by computing weight from reshaping first, it losses the precision by the clipping operation to get an integer dQP$_{auto}$. Instead, directly using the slope function to calculate weight from reshaping can preserve higher precision of the weight and therefore is more favorable.

Denote as W$_{dQP}$ the weight derived from input lumaDQP. Let f'(x) denote the first derivative (or slope) of the forward reshaping curve. In an embodiment, the total weight takes into consideration both the dQP values and the shape of the reshaping curve, thus a total weight value may be expressed as:

$$\text{weight}_{total} = Clip3(0.0, 30.0, W_{dQP} * f'(x)^2). \quad (11)$$

A similar approach can be applied to chroma components as well. For example, in an embodiment, for chroma, dQP[x] can be defined according to Table 13.

Interaction with Other Coding Tools

When reshaping is enabled, this section provides several examples of proposed changes needed in other coding tools. The interactions might exist for any possible existing or future coding tools to be included in the next generation video coding standard. The examples given below are not limiting. In general, the video signal domain (reshaped, non-reshaped, inverse-reshaped) during the coding steps need to be identified and operations dealing with the video signal at each step need to take the reshaping effect into consideration.

Cross-Component Linear Model Prediction

In CCLM (cross-component linear model prediction) (Ref. [8]) predicted chroma samples $pred_C(i, j)$ may be derived using a luma reconstruction signal $rec_L'(i, j)$:

$$pred_C(i, j) = a \cdot rec_L'(i, j) + \beta. \quad (12)$$

When reshaping is enabled, in an embodiment, one may need to distinguish if the luma reconstructed signal is in reshaped domain (e.g., out-of-loop reshaper or in-loop intra reshaper) or in non-reshaped domain (e.g., in-loop residual reshaper). In one embodiment, one can implicitly use the reconstruction luma signal as-is without any additional signaling or operation. In other embodiments, if the reconstructed signal is in a non-reshaped domain, one may translate the reconstruction luma signal to also be in the non-reshaped domain, as in:

$$pred_C(i, j) = a \cdot Inv(rec_L'(i, j)) + \beta. \quad (13)$$

In other embodiments, one can add bitstream syntax elements to signal which domain is desired (reshaped or non-reshaped), which can be decided by an RDO process, or one can derive the decision based on decoded information, thus saving overhead required by explicit signaling. One can perform corresponding operations to the reconstructed signal based on the decision.

Reshaper with Residual Prediction Tool

In the HEVC range extension profile, a residual prediction tool is included. The chroma residual signal is predicted from the luma residual signal at the encoder side as:

$$\Delta r_C(x, y) = r_C(x, y) - (\alpha \times r_L'(x, y)) >> 3, \quad (14)$$

and it is compensated at the decoder side as:

$$r_C'(x, y) = \Delta r_C'(x, y) + (\alpha \times r_L'(x, y)) >> 3, \quad (15)$$

where $r_C$ denotes the chroma residual sample at a position (x, y), $r_L'$ denotes the reconstructed residual sample of the luma component, $\Delta r_C$ denotes the predicted signal using inter-color prediction, $\Delta r_C'$ denotes the reconstructed signal after coding and decoding $\Delta r_C$, and $r_C'$ denotes the reconstructed chroma residual.

When reshaping is enabled, one may need to consider which luma residual to use for chroma residual prediction. In one embodiment, one may use the "residual" as-is (may be reshaped or non-reshaped based on reshaper architecture). In another embodiment, one may enforce the luma residual to be in one domain (such as in non-reshaped domain) and perform proper mappings. In another embodiment, proper handling may either be derived by a decoder, may be explicitly signaled as described earlier.

Reshaper with Adaptive Clipping

Adaptive Clipping (Ref. [8]) is a new tool introduced to signal an original data range with respect to the content dynamics, and do adaptive clipping instead of fixed clipping (based on internal bit-depth information) at each step in the compression workflow (e.g., in transform/quantization, loop filtering, output) where clipping happens. Let $$T_{clip} = Clip_{BD}(T, bitdepth, C) = Clip3(min_C, max_C, T), \quad (16)$$

where x=Clip3(min, max, c) denotes:

$$x = \begin{cases} min, & \text{if } c \leq min \\ max, & \text{if } c \geq max, \\ c, & \text{otherwise} \end{cases}$$

and

C is the component ID (typically Y, Cb, or Cr)

$min_C$ is the lower clipping bound used in current slice for component ID C $max_C$ is the upper clipping bound used in current slice for component ID C When reshaping is enabled, in an embodiment, one may need to figure out the domain the data flow is currently in and to perform the clipping correctly. For example, if dealing with clipping in reshaped domain data, the original clipping bounds need to be translated to the reshaped domain:

$$T_{clip} = Clip_{BD}(T, bitdepth, C) = Clip3(Fwd(min_C), Fwd(max_C), T). \quad (17)$$

In general, one needs to process each clipping step properly with respect to the reshaping architecture.

Reshaper and Loop Filtering

In HEVC and JEM 6.0 software, the loop filters, such as ALF and SAO need to estimate optimal filter parameters using reconstructed luma samples and the uncompressed "original" luma samples. When reshaping is enabled, in an embodiment, one may specify (explicitly or implicitly) the domain they want to perform filter optimization. In one embodiment, one can estimate the filter parameters on the reshaped domain (when reconstruction is in reshaped domain, versus a reshaped original). In other embodiments, one can estimate the filter parameters on non-reshaped domain (when reconstruction is in the non-reshaped domain or inverse reshaped, versus the original).

For example, depending on the in-loop reshaping architecture, the in-loop filter optimization (ILFOPT) options and operations can be described by Tables 14 and 15.

TABLE 14

In loop filtering optimization in in-loop intra only
reshaping architect and in-loop hybrid reshaping

|  | Intra-frame | Inter-frame |
| --- | --- | --- |
| Option 1: estimate and perform loop filtering (LF) in reshaped domain; | Encoder side:<br>Use the already reshaped original intra image as LF reference<br>Use the reconstructed intra image (in reshaped domain) and LF reference to estimate LF parameters; two cases, depending on the position of the LF module versus the inverse reshaping module (block 265 and 270 in FIG. 2C):<br>if inverse reshaping is performed before LF, need to apply forward reshaping on the reconstructed intra image<br>if inverse reshaping is to be performed after LF, use the reconstructed intra image directly<br>Apply LF to the reconstructed intra image in reshaped domain<br>Inverse reshape the whole reconstructed intra image<br>Store in DPB<br>Decoder side:<br>Apply LF to the reconstructed intra image in reshaped domain; two cases, depending on the position of the LF module versus the inverse reshaping module (block 265 and 270 in FIG. 2D):<br>if inverse reshaping is performed before LF, need to forward reshape the reconstructed intra image before applying LF<br>if inverse reshaping is to be performed after LF, apply LF on reconstructed intra image directly<br>Inverse reshape the whole reconstructed intra image<br>Store in DPB | Encoder side:<br>Forward reshape original inter image as LF reference<br>Forward reshape the reconstructed inter image<br>Estimate LF parameters<br>Apply LF to the reconstructed inter image in reshaped domain<br>Inverse reshape the whole reconstructed inter image<br>Store in DPB<br>Decoder side:<br>Forward reshape the reconstructed inter image<br>Apply LF to the reconstructed inter image in reshaped domain<br>Inverse reshape the whole reconstructed inter image<br>Store in DPB |
| Option 2: estimate and perform LF in the non-reshaped domain | Encoder side:<br>Inverse reshape original image as LF reference if in-loop reshaping has been performed on original image buffer; or fetch non-reshaped original image as LF reference<br>Inverse reshape the reconstructed intra image<br>Estimate LF parameters<br>Inverse-reshape the whole reconstructed image<br>Apply LF to the reconstructed intra image<br>Store in DPB<br>Decoder side:<br>Inverse-reshape the whole reconstructed image<br>Apply LF to the reconstructed intra image<br>Store in DPB | (Exact traditional LF workflow)<br>Encoder side:<br>Use the reconstructed inter image and original image as LF reference to estimate LF parameters<br>Apply LF to the reconstructed inter image<br>Store in DPB<br>Decoder side:<br>Apply LF to the reconstructed inter image<br>Store in DPB |

TABLE 15

| In loop filtering optimization in in-loop residue reshaping architect | |
| --- | --- |
| In-loop residue reshaping | Intra-frame and Inter-frame (same as Inter-frame operations in Table 14) |

While most of the detailed discussions herein refer to methods performed on the luminance component, a person skilled in the art will appreciate that similar methods may be performed in the chroma color components and chroma related parameters, such as chromaQPOffset (e.g., see Ref. [9]).

In-Loop Reshaping and Regions of Interest (ROI)

Given an image, as used herein, the term 'region of interest' (ROI) denotes a region of the image that is considered of special interest. In this section, novel embodiments are presented which support in-loop reshaping for region of interests only. That is, in an embodiment, reshaping may be applied only inside an ROI and not outside. In another embodiment, one may apply different reshaping curves in a region of interest and outside the region of interest.

The use of ROIs is motivated by the need to balance bit rate and image quality. For example, consider a video sequence of a sunset. On the top-half of the images one may have the sun over a sky of relatively uniform color (thus pixels in the sky background may have very low variance). In contrast, the bottom half of the image may depict moving waves. From a viewer's perspective, the top may be considered far more important than the bottom. On the other hand, the moving waves, due to higher variance in their pixels, are harder to compress, requiring more bits per pixels; however, one may want to allocate more bits on the sun-part than the waves part. In this case, the top half could be denoted as the region of interest.

ROI Description

Nowadays most codecs (e.g., AVC, HEVC, and the like) are block based. To make implementation simple, one can specify the region in units of blocks. Without limitation, using HEVC as an example, a region may be defined as a multiple of Coding Units (CUs) or Coding Tree Units (CTUs). One can specify one ROI or multiple of ROIs. Multiple ROIs can be distinct or overlapped. An ROI does not need to be rectangle. The syntax for ROIs may be provided at any level of interest, such as the slice level, the picture level, the video stream level, and the like. In an embodiment, the ROI is specified first in the sequence parameter set (SPS). Then in a slice header, one can allow small variations of ROI. Table 16 depicts an example of syntax where one ROI is specified as multiple CTUs in a rectangle region. Table 17 describes the syntax of a modified ROI at the slice level.

TABLE 16

| SPS syntax for ROI | |
| --- | --- |
| | Descriptor |
| SPS( ) {<br>...<br>  sps_reshaper_enable_flag<br>  if (sps_reshaper_enable_flag) {<br>    .....<br>    sps_reshaper_active_ROI_flag<br>    if (sps_reshaper_active_ROI_flag) {<br>      reshaper_active_ROI_in_CTUsize_left<br>      reshaper_active_ROI_in_CTUsize_right | <br><br>u(1)<br><br><br>u(1)<br><br>ue(v)<br>ue(v) |

TABLE 16-continued

| SPS syntax for ROI | |
| --- | --- |
| | Descriptor |
|       reshaper_active_ROI_in_CTUsize_top<br>      reshaper_active_ROI_in_CTUsize_bottom<br>    }<br>  }<br>....<br>} | ue(v)<br>ue(v) |

TABLE 17

| Slice header syntax for ROI | |
| --- | --- |
| | Descriptor |
| reshaping_sliceheader_table( ) {<br>...<br>  if (sps_reshaper_active_ROI_flag) {<br>    reshape_model_ROI_modification_flag<br>    if (reshape_model_ROI_modification_flag) {<br>      reshaper_ROI_mod_offset_left<br>      reshaper_ROI_mod_offset_right<br>      reshaper_ROI_mod_offset_top<br>      reshaper_ROI_mod_offset_bottom<br>    }<br>  }<br>....<br>} | <br><br><br>u(1)<br><br>se(v)<br>se(v)<br>se(v)<br>se(v) | sps_reshaper_active_ROI_flag equal to 1 specifies that ROI exists in the coded video sequence (CVS). sps_reshaper_active_ROI_flag equal to 0 specifies that ROI does not exist in CVS.

reshaper_active_ROI_in_CTUsize_left, reshaper_active_ROI_in_CTUsize_right, reshaper_active_ROI_in_CTUsize_top and reshaper_active_ROI_in_CTUsize_bottom, each specifies the sample of the pictures in ROI, in terms of a rectangle region specified in picture coordinates. The coordinates are equal to offset*CTUsize for left and top and offset*CTUsize−1 for right and bottom.

reshape_model_ROI_modification_flag equal to 1 specifies that ROI is modified in current slice. reshape_model_ROI_modification_flag equal to 0 specifies that ROI is not modified in current slice.

reshaper_ROI_mod_offset_left, reshaper_ROI_mod_offset_right, reshaper_ROI_mod_offset_top, and reshaper_ROI_mod_offset_bottom each specifies the offset value of left/right/top/bottom from reshaper_active_ROI_in_CTUsize_left, reshaper_active_ROI_in_CTUsize_right, reshaper_active_ROI_in_CTUsize_top and reshaper_active_ROI_in_CTUsize_bottom.

For multiple ROIs, the example syntax for Tables 16 and 17 for a single ROI could be extended using an index (or ID) for each ROI, similarly to the scheme used in HEVC to define using SEI messaging multiple pan-scan rectangles (see HEVC specification, Ref. [11], Section D.2.4).

Processing of ROIs in In-Loop Intra-Only Reshaping

For intra-only reshaping, the ROI part of the picture is reshaped first, then coding is applied. Because reshaping is only applied to the ROI, one might see a boundary between the ROI and non-ROI parts of a picture. Since a loop filter (e.g. 270 in FIG. 2C or FIG. 2D) can go across boundaries, special care must be taken for ROIs for loop filter optimization (ILFOPT). In an embodiment, it is proposed that that loop filter is applied only where the whole decoded picture is in the same domain. That is, the whole picture is either all in the reshaped domain or all in the non-reshaped domain. In one embodiment, at the decoder side, if loop filtering is applied on a non-reshaped domain, one should first apply inverse reshaping to the ROI section of the decoded picture, and then apply the loop filter. Next, the decoded picture is stored into the DPB. In another embodiment, if the loop filter is applied on the reshaped domain, one should first apply reshaping to the non-ROI part of the decoded picture, then apply the loop filter, and then inverse reshape the whole picture. Next, the decoded picture is stored into the DPB. In yet another embodiment, if loop filtering is applied on the reshaped domain, one can first inverse-reshape the ROI part of the decoded picture, then reshape the whole picture, then apply the loop filter, then inverse reshape the whole picture. Next, the decoded picture is stored into the DPB. The three approaches are summarized in Table 18. From a computation point of view, method "A" is the simpler. In an embodiment, the enabling of ROI can be used to specify the order of performing inverse reshaping versus loop filtering (LF). For example, if ROI is actively used (e.g. SPS syntax flag=true), then LF (block 270 in FIG. 2C and FIG. 2D) is performed after inverse reshaping (block 265 in FIG. 2C and FIG. 2D). If ROI is not actively used, then LF is performed before inverse reshaping.

TABLE 18

Loop-filtering (LF) options using ROIs

| Method A | Method B | Method C |
|---|---|---|
| Inverse-reshape the ROI of a decoded picture Apply Loop filtering (LF) to the whole picture Store in DPB | Apply reshaping to the non-ROI part of a decoded picture Apply LF to the whole picture Inverse-reshape the whole picture Store in DPB | Inverse-reshape the ROI of a decoded picture Reshape the whole picture Apply LF to the whole picture Inverse-reshape the whole picture Store in DPB |

Processing of ROIs in In-Loop Prediction Residual Reshaping

For an in-loop (prediction) residuals reshaping architecture (e.g., see 200C_D in FIG. 2F), at the decoder, using equation (3), processing may be expressed as:

```
If (currentCTU belongs to ROI)
    Reco_sample= Inv(Res_d + Fwd(Pred_sample)),   (see equation (3))
else
    Reco_sample= Res_d + Pred_sample
end
```

ROIs and Encoder Considerations

In an encoder, each CTU needs to be checked whether it belongs to an ROI or not. For example, for in-loop, prediction residual reshaping, a simple check based on equation (3) may perform:

```
If (currentCTU belong to ROI)
    apply weighted distortion in RDO for luma. The weigh is derived based
      on equation (10)
else
    apply non-weighted distortion in RDO for luma
end
```

An example encoding workflow which takes into consideration ROIs during reshaping may comprise the following steps:

For an Intra picture:
    Apply forward reshaping to the ROI area of the original picture
    Code the Intra frame
    Apply inverse reshaping to the ROI area of the reconstructed picture before the loop filter (LF)
    Perform loop filtering in the unshaped domain as follows (e.g., see method "C" in Table 18), which includes the following steps:
        Apply forward reshaping to the Non-ROI area of the original picture (in order to make the whole original picture reshaped for the loop filter reference)
        Apply forward reshaping to the whole picture area of the reconstructed picture
        Derive loop filter parameters and apply loop filtering
        Apply inverse reshaping to the whole picture area of the reconstructed picture and store in the DPB At encoder side, since LF need to have non-compressed reference image for filter parameter estimation, the treatment of LF reference for each method is as in Table 19:

TABLE 19

Treatment of LF reference regarding ROIs

| Method A | Method B | Method C |
|---|---|---|
| Use non-reshaped original input picture for LF reference; | Apply reshaping on whole (both non-ROI and ROI part) of the original input picture for LF reference; | Apply reshaping on whole (both non-ROI and ROI part) of the original input picture for LF reference; |

For an Inter picture:
    When coding an inter frame, for each CU inside the ROI, apply prediction residual reshaping and weighted distortion on luma; for each CU outside the ROI, do not apply any reshaping
    Loop filtering optimization (option 1) is performed as before (as if no ROI has been used):
        Forward reshape the whole picture area of the original picture
        Forward reshape the whole picture area of the reconstructed picture
        Derive loop filter parameters and apply loop filtering
        Apply inverse reshaping to the whole picture area of the reconstructed picture and store in DPB Reshaping of HLG-Coded Content The term HybridLog-Gamma or HLG denotes another transfer function defined in Rec. BT. 2100 for mapping high-dynamic range signals. HLG was developed to maintain backward compatibility with traditional standard dynamic range signals coded using the traditional gamma function. When comparing the codeword distribution between PQ-coded content and HLG-coded content, the PQ mapping tends to allocate more codewords in dark and bright areas, while the majority of HLG content codewords appears to be allocated into the middle range. Two approaches can be used for HLG luma reshaping. In one embodiment, one may simply convert HLG content into PQ content and then apply all the PQ-related reshaping techniques discussed earlier. For example, the following steps could be applied:

1) Map HLG luminance (e.g., Y) to PQ luminance. Let the function or LUT of the transformation be denoted as HLG2PQLUT(Y)

2) Analyze the PQ luminance values and derive a PQ-based forward reshaping function or LUT. Denote it as PQAdpFLUT(Y)

3) Merge the two functions or LUTs into a single function or LUT: HLGAdpFLUT[i]=PQAdpFLUT [HLG2PQLUT[i]].

Since HLG codeword distribution is quite different from the PQ codeword distribution, such an approach may produce suboptimal reshaping results. In another embodiment, the HLG reshaping function is derived directly from HLG samples. One may apply the same framework as used for PQ signals, but change the CW_Bins_Dft table to reflect characteristics of an HLG signal. In an embodiment, using the mid-tones profile for HLG signals, several CW_Bins_Dft Tables are designed according to user-preferences. For example, when it is preferred to preserve highlights, for alpha=1.4, g_DftHLGCWBin0={8, 14, 17, 19, 21, 23, 24, 26, 27, 28, 29, 30, 31, 32, 33, 34, 35, 36, 36, 37, 38, 39, 39, 40, 41, 41, 42, 43, 43, 44, 44, 30}.

When it is preferred to preserve the mid-tones (or mid-range):

g_DftHLGCWBin1={12, 16, 16, 20, 24, 28, 32, 32, 32, 32, 36, 36, 40, 44, 48, 52, 56, 52, 48, 44, 40, 36, 36, 32, 32, 32, 26, 26, 20, 16, 16, 12}.

When it is preferred to preserve skin tones:

g_DftHLGCWBin2={12, 16, 16, 24, 28, 32, 56, 64, 64, 64, 64, 56, 48, 40, 32, 32, 32, 32, 32, 32, 28, 28, 24, 24, 20, 20, 20, 20, 20, 16, 16, 12};

From a bitstream syntax point of view, to differentiate between PQ and HLG-based reshaping, a new parameter, denoted as sps_reshaper_signal_type, is added, where the value sps_reshaper_signal_type indicates the signal type that was reshaped (e.g., 0 for gamma-based SDR signals, 1 for PQ-coded signals, and 2 for HLG-coded signals).

Examples of syntax tables for HDR reshaping in SPS and slice header for both PQ and HLG, with all features discussed earlier (e.g., ROI, in loop filter optimization (ILFOPT), and ChromaDQPAdjustment), are shown in Tables 20 and 21.

TABLE 20

Example SPS syntax for reshaping

| | | Descriptor |
|---|---|---|
| SPS( ) | | |
| ...... | | |
| sps_reshaper_enable_flag | /* 1: reshaping on, else off */ | u(1) |
| if (sps_reshaper_enable_flag) { | | |
| sps_reshaper_adaptive_flag | /* 1: adaptive reshaping is on, else off */ | u(1) |
| sps_reshaper_signal_type | /* e.g.: 0: SDR, 1:PQ, 2: HLG */ | u(2) |
| sps_in_loop_filter_opt_flag | /* ILFOPT flag*/ | u(1) |
| sps_luma_based_chroma_qp_offset_flag | | u(1) |
| /*chromaDQPAjustment flag*/ | | |
| sps_reshaper_active_ROI_flag | | u(1) |
| if (sps_reshaper_active_ROI_flag) { | | |
| reshaper_active_ROI_in_CTUsize_left | | ue(v) |
| reshaper_active_ROI_in_CTUsize_right | | ue(v) |

TABLE 20-continued

Example SPS syntax for reshaping

| | Descriptor |
|---|---|
| reshaper_active_ROI_in_CTUsize_top | ue(v) |
| reshaper_active_ROI_in_CTUsize_bottom | ue(v) |
| } | |
| } | | spsin_loop_Mler_opt_flag equal to 1 specifies that in-loop filter optimization to be performed in the reshaped domain in the coded video sequence (CVS).

spsin_loop_filter_opt_flag equal to 0 specifies that in-loop filter optimization to be performed in the non-reshaped domain in CVS.

spsumabased_chroma_p_offsetflag equal to 1 specifies that luma based chroma QP offset is derived (e.g. according to Table 11 or 12) and applied to chroma coding of each CU in the coded video sequence (CVS). spsjluma_based_chroma_gpoffset_fag equal to 0 specifies that luma based chroma QP offset is not enabled in CVS.

TABLE 21

Example syntax for reshaping at the slice level

| | Descriptor |
|---|---|
| reshaping_sliceheader_table_model( ) { | |
| reshape_model_profile_type | ue(v) |
| reshape_model_scale_idx | u(2) |
| reshape_model_min_bin_idx | u(5) |
| reshape_model_max_bin_idx | u(5) |
| reshape_model_num_band | u(4) |
| for ( i = 0; i < reshape_model_num_band; i++ ) { | |
| reshape_model_band_profile_delta [ i ] | u(1) |
| } | |
| if (sps_reshaper_active_ROI_flag) { | |
| reshape_model_ROI_modification_flag | u(1) |
| if (reshape_model_ROI_modification_flag) { | |
| reshaper_ROI_mod_offset_left | se(v) |
| reshaper_ROI_mod_offset_right | se(v) |
| reshaper_ROI_mod_offset_top | se(v) |
| reshaper_ROI_mod_offset_bottom | se(v) |
| } | |
| } | |
| } | |

Improving Chroma Quality

Proponents of HLG-based coding argue that it provides better backward compatibility with SDR signaling. Therefore, in theory, HLG-based signals could employ the same encoding settings as legacy SDR signals. But when viewing HLG-coded signals in HDR mode, some color artifacts can still be observed, especially in achromatic regions (such as white and gray color). In an embodiment, such artifacts can be reduced by adjusting the chromaQPOffset values during encoding. It is suggested that for HLG content one applies less aggressive chromaQP adjustment than what is used when coding PQ signals. For example, in Ref. [10], the model to assign QP offsets for Cb and Cr based on the luma QP and a factor based on the capture and representation colour primaries is described as:

$$QPoffsetCb = Clip3\ (-12, 0, \text{Round}(c_{cb} * (k * QP + l))), \quad (18a)$$

$$QPoffsetCr = Clip3\ (-12, 0, \text{Round}(c_{cr} * (k * QP + l))), \quad (18b)$$

where $e_{cb}=1$ if the capture color primaries are the same as the representation color primaries, $c_{cb}=1.04$ if the capture color primaries are equal to the P3D65 primaries and the representation color primaries are equal to the Rec. ITU-R BT.2020 primaries, and $e_{cb}=1.14$ if the capture color primaries are equal to the Rec. ITU-R BT.709 primaries and the representation color primaries are equal to the Rec. ITU-R BT.2020 primaries. Similarly, $c_{cr}=1$ if the capture color primaries are the same as the representation color primaries, $c_{cr}=1.39$ if the capture color primaries are equal to the P3D65 primaries and the representation color primaries are equal to the Rec. ITU-R BT.2020 primaries, and $c_{cr}=1.78$ if the capture color primaries are equal to the Rec. ITU-R BT.709 primaries and the representation color primaries are equal to the Rec. ITU-R BT.2020 primaries. Finally, $k=-0.46$ and $l=0.26$.

Figure 6A:
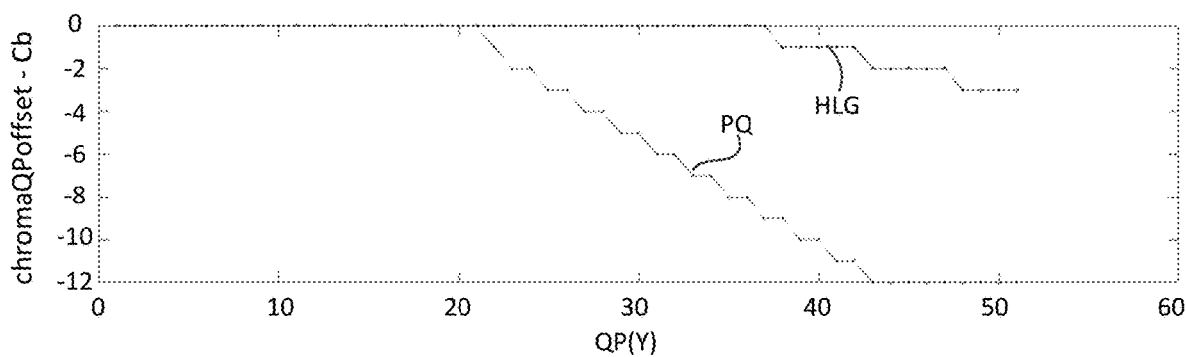
FIG. 6A and FIG. 6B depict examples of how chroma QP offset values change according to the luma quantization parameter (QP) for PQ- and HLG-coded signals according to an embodiment of this invention.
Figure 6B:
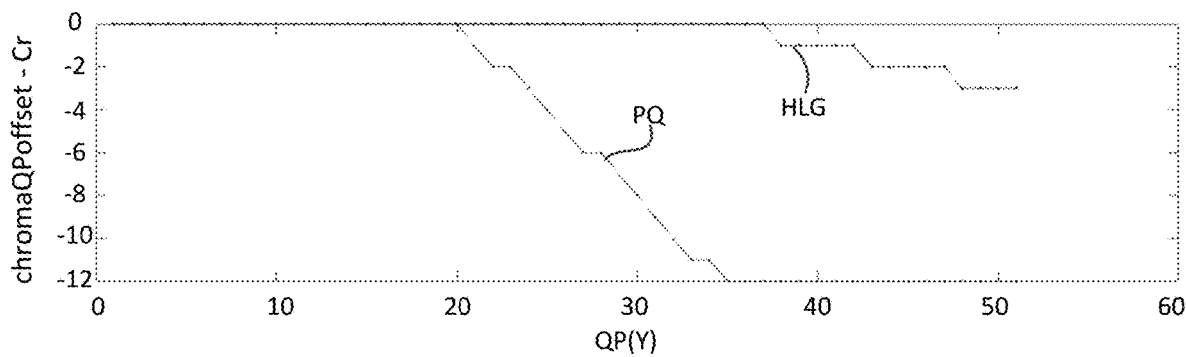

In an embodiment, it is proposed to use the same model but with different, parameters that yield a less aggressive chromaQPOffset change. For example, without limitation, in an embodiment, for Cb in equation (18a), $e_{cb}=1$, $k=-0.2$, and $l=7$, and for Cr in equation (18b), $c_{cr}=1$, $k=-0.2$, and $l=7$. FIG. 6A and FIG. 6B depict examples of how chromaQPOffset values change according to the luma quantization parameter (QP) for PQ (Rec. 709) and HLG. PQ-related values change more dramatically than HLG-related values. FIG. 6A corresponds to Cb (equation (18a)), while FIG. 6B corresponds to Cr (equation (18b)).

REFERENCES

Each one of the references listed herein is incorporated by reference in its entirety.
[1] PCT Application PCT/US2016/025082, In-Loop Block-Based Image Reshaping in High Dynamic Range Video Coding, filed on Mar. 30, 2016, also published as WO 2016/164235, by G-M. Su.
[2] D. Baylon, Z. Gu, A. Luthra, K. Minoo, P. Yin, F. Pu, T. Lu, T. Chen, W. Husak, Y. He, L. Kerofsky, Y. Ye, B. Yi, "Response to Call for Evidence for HDR and WCG Video Coding: Arris, Dolby and InterDigital", Doc. m36264, July (2015), Warsaw, Poland.
[3] U.S. patent application Ser. No. 15/410,563, Content-Adaptive Reshaping for High Codeword representation Images, filed on Jan. 19, 2017, by T. Lu et al.
[4] PCT Application PCT/US2016/042229, Signal Reshaping and Coding for HDR and Wide Color Gamut Signals, filed on Jul. 14, 2016, also published as WO 2017/011636, by P. Yin et al.
[5] "Exploratory Test Model for HDR extension of HEVC", K. Minoo et al., MPEG output document, JCTVC-W0092 (m37732), 2016, San Diego, USA.
[6] E. François, J. Sole, J. Ström, P. Yin, "Common Test Conditions for HDRIWCG video coding experiments", JCTVC doc. Z1020, Geneva, January 2017.
[7] A. Segall, E. Francois, and D. Rusanovskyy, "JVET common test conditions and evaluation procedures for HDR/WCG Video," JVET-E1020, ITU-T meeting, Geneva, January 2017.
[8] JEM 6.0 software: https://jvet.hhi.fraunhofer.de/svn/svn_HMJEMSoftware/tags/HM-16.6-JEM-6.0
[9] U.S. Provisional Patent Application Ser. No. 62/406,483, filed on Oct. 11, 2016, "Adaptive Chroma Quantization in Video Coding for Multiple Color Imaging Formats," T. Lu et al., also filed as U.S. patent application Ser. No. 15/728,939, published as U.S. Patent Application Publication US 2018/0103253.
[10] J. Samuelsson et al. (Eds), "Conversion and coding practices for HDR/WCG Y'CbCr 4:2:0 Video with PQ Transfer Characteristics," JCTVC-Y1017, ITU-T/ISO meeting, Chengdu, October 2016.
[11] ITU-T H.265, "High efficiency video coding," ITU, version 4.0, (December 2016).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to integrated signal reshaping and coding of images, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to integrated signal reshaping and coding of images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient integrated signal reshaping and coding of images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for encoding images, the method comprising:
    accessing an input image in a first codeword representation;
    generating a forward reshaping function mapping pixels of the input image to a second codeword representation;
    generating an inverse reshaping function based on the forward reshaping function, wherein the inverse reshaping function maps pixels from the second coding representation to the first coding representation;
    generating coded pixel regions of the input image based on input pixel regions in the input image, the forward reshaping function and the inverse reshaping function;
    generating reshaping metadata which characterize the forward reshaping function based on a piecewise-linear representation; and
    generating an output bitstream based on the coded pixel regions of the input image and the reshaping metadata.

2. The method of claim 1, wherein generating the coded pixel regions of the input image comprises applying in-loop reshaping to the input image.

3. The method of claim 1, wherein for an input pixel region in the input image, generating a coded pixel region comprises:
    computing a predicted region based on pixel data in a reference frame buffer or previously coded spatial neighbors;
    generating a reshaped residual region based on the input pixel region, the predicted region, and the forward reshaping function, wherein a reshaped residual sample in the reshaped residual region is derived at least in part from forward reshaping a respective predicted sample in the predicted region;
    generating a quantized residual region based on the reshaped residual region;
    generating a dequantized residual region based on the quantized residual region;
    generating a reconstructed pixel region based on the dequantized residual region, the predicted region, the forward reshaping function, and the inverse reshaping function; and
    generating a reference pixel region to be stored on the reference frame buffer based on the reconstructed pixel region.

4. The method of claim 3, wherein generating the quantized residual region comprises:
    applying a forward coding transform to the reshaped residual region to generate transformed data; and
    applying a forward coding quantizer to the transformed data to generate quantized data.

5. The method of claim 4, wherein generating the dequantized residual region comprises:
    applying an inverse coding quantizer to the quantized data to generate inverse-quantized data; and
    applying an inverse coding transform to the inverse-quantized data to generate the dequantized residual region.

6. The method of claim 3, wherein generating the reference pixel region to be stored on the reference frame buffer comprises applying a loop filter to the reconstructed pixel region.

7. A method for decoding a coded bitstream to generate an output image in a first codeword representation, the method comprising:
    receiving a coded image partially coded in a second codeword representation;
    receiving reshaping metadata for the coded image;
    generating based on the reshaping metadata a forward reshaping function mapping pixels from the first codeword representation to the second codeword representation;
    generating based on the reshaping metadata an inverse reshaping function, wherein the inverse reshaping function maps pixels from the second codeword representation to the first codeword representation; and
    decoding coded regions of the coded image based on the forward reshaping function and the inverse reshaping function to generate output pixel regions.

8. The method of claim 7, wherein decoding the coded regions of the coded image is based on in-loop reshaping.

9. The method of claim 7, wherein decoding a coded region further comprises:
    generating a decoded reshaped residual region;
    generating a predicted region based on pixels in a reference pixel buffer or previously decoded spatial neighbors;
    generating a reconstructed pixel region based on the decoded reshaped residual region, the predicted region, the forward reshaping function, and the inverse reshaping function, wherein a reconstructed sample in the reconstructed pixel region is derived at least in part from forward reshaping a respective predicted sample in the predicted region;
    generating an output pixel region for the output image based on the reconstructed pixel region; and
    storing the output pixel region in the reference pixel buffer.

10. The method of claim 7, wherein the metadata characterize the forward reshaping function based on a piecewise linear representation, and for each segment of the piecewise linear representation of the forward reshaping function, the reshaping metadata comprise a delta absolute value and a sign of the delta absolute value.

* * * * *